(12) United States Patent
Aujoulet et al.

(10) Patent No.: US 12,711,457 B2
(45) Date of Patent: Aug. 18, 2026

(54) SMART SHARING OPTIONS FOR POPULATING A SHARED DIGITAL ASSET LIBRARY

(71) Applicant: Apple Inc., Cupertino, CA (US)

(72) Inventors: Kevin Aujoulet, San Francisco, CA (US); Andreas J. Karlsson, San Jose, CA (US); Andrey Leonov, Santa Clara, CA (US); Benjamin P. Englert, Oakland, CA (US); Michael C. Li, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 380 days.

(21) Appl. No.: 18/328,628

(22) Filed: Jun. 2, 2023

(65) Prior Publication Data

US 2023/0394089 A1 Dec. 7, 2023

Related U.S. Application Data

(60) Provisional application No. 63/365,827, filed on Jun. 3, 2022.

(51) Int. Cl.
*G06F 16/9035* (2019.01)

(52) U.S. Cl.
CPC ................................ *G06F 16/9035* (2019.01)

(58) Field of Classification Search
CPC .... G06F 16/9035; G06Q 10/04; G06Q 50/01; G06Q 10/10
See application file for complete search history.

(56) References Cited

U.S. PATENT DOCUMENTS

2007/0011042 A1* 1/2007 Kim ........................ G06Q 30/02 707/600
2008/0263103 A1 10/2008 McGregor
2008/0304808 A1 12/2008 Newell
2011/0115915 A1* 5/2011 Velusamy ............. H04N 7/185 348/E5.022
2014/0136098 A1* 5/2014 Stroila .................. H04N 7/185 701/408
2015/0043831 A1 2/2015 Arfvidsson
2015/0213355 A1 7/2015 Sharma
2019/0340529 A1 11/2019 Circlaeys
2020/0012817 A1 1/2020 Damick
2020/0059269 A1* 2/2020 Carter .................. H04W 16/18
2022/0075591 A1 3/2022 Cardenas Gasca

FOREIGN PATENT DOCUMENTS

CN 107710197 A 2/2018

* cited by examiner

*Primary Examiner* — Jared M Bibbee
(74) *Attorney, Agent, or Firm* — Blank Rome LLP

(57) ABSTRACT

This disclosure relates to systems and methods related to smart sharing options for a shared digital asset (DA) library. An example method performed by a system includes: initiating a camera session; identifying a sharable DA trigger; capturing a DA during the camera session after identifying the sharable DA trigger; and selecting the captured DA for the shared DA library based on the identified sharable DA trigger.

16 Claims, 7 Drawing Sheets

300
206
NETWORK DEVICES
302
314
DB
112
A1
B2
C3
TRANSLATOR
304
A1
B2
C3
GRAPH UPDATE MANAGER 308
A
KNOWLEDGE GRAPHS 120
INGEST PROCESSOR 312
APPLICATIONS
305
GRAPH MANAGER 310
ANALYZER 316
ELECTRONIC DEVICE 301

SMART SHARING OPTIONS FOR POPULATING A SHARED DIGITAL ASSET LIBRARY

TECHNICAL FIELD

This disclosure relates generally to the field of content management for end-user devices in a networked environment. More particularly, the disclosure relates to systems and processes that support smart sharing options for populating a shared digital asset (DA) library.

BACKGROUND

Modern consumer electronics (end-user devices) have enabled users to create, purchase, and a mass considerable amounts of digital assets (e.g., images, videos, etc.). For example, computing systems (e.g., a smartphone, a stationary computer system, a portable computer system, a media player, a tablet computer system, a wearable computer system or device, etc.) routinely have access to tens of thousands and even hundreds of thousands of photos/videos, and collections of photos/videos.

The digital assets (DAs) obtained by end-user devices may be categorized in different ways. One way to categorize DAs relates to relative priority (e.g., designating DAs as primary DAs and secondary DAs). Primary DAs may be captured by sensors (e.g., cameras, microphones, etc.) included with the end-user device, external sensors coupled to the end-user device (e.g., an external web camera, specialty camera, etc.), or is obtained from trusted sources associated with the user (e.g., the DA library of the user's cloud account; the DA library of the user's computer, laptop, or other display device; direct imports from cameras, memory cards, scanners or other devices; imports from end-user devices that are previously identified as a trusted source by a user; and/or any other trusted sources). Secondary DAs may be received by the end-user device from other users' devices via a wired or wireless communication interface, or from other secondary sources (e.g., any application on the end-user device which can receive DAs; the DA library of another user's end-user device; imports from end-user devices that are not previously identified as a trusted source by a user). Primary DAs may be automatically added to a personal DA library of an end-user, while secondary DAs may not be automatically added to the personal DA library of the end-user device. The personal DA library provides various options to query, organize, and highlight DAs.

One of the benefits of categorizing DAs according to relative priority (e.g., a primary DA or a secondary DA designation) or other categories is that it may allow an end-user to better assess how to manage a personal DA library accessed or backed up via a cloud-based platform. For different end-users, the amount of cloud-based storage for their respective personal DA libraries may vary as a subscription option, which may influence how each end-user or control interface decides to manage populating an end-user's personal DA library with DAs. Another service being developed as a cloud-based platform feature accessible via end-user devices is a shared DA library. Each shared DA library will be stored in cloud-based storage separately from an end-user's personal DA library and may be established as a subscription option for a particular end-user. Once a shared DA library is established by the particular end-user, all participants of the shared DA library will be able to access the shared DA library (but not the particular end-user's personal DA library). Determining how to populate a shared DA library is an issue that not been resolved. If only based on end-user selection of DAs (many end-user devices and/or personal DA libraries already have many thousands of photos/videos), populating a shared DA library will be tedious for end-users. With automation, there is a higher likelihood that populating a shared DA library may result in unintended DAs being transferred to the shared DA library.

SUMMARY

Methods and systems related to smart sharing options for populating a shared digital asset (DA) library are described herein. Example smart sharing options include: sharing automation options; sharing suggestion options; and sharing policies based on user input. The sharing automation options and/or the sharing suggestion options may be based on sharable DA triggers (e.g., location, time, detection of nearby end-users or related end-user devices), DA analysis (e.g., facial recognition, metadata analysis, and/or knowledge graph analysis), sharable context metrics (e.g., determine a likelihood that an existing DA, a new DA, or a soon to be captured DA is a sharable DA), and/or previous user input. Over time, machine learning techniques may be applied to fine-tune the sharing automation options and/or the sharing suggestion options in a manner that eventually reduces the amount of input received from an end-user (i.e., sharing automation can theoretically be achieved once end-user sharing preferences and camera use are better understood and accounted for). Examples of sharing automation include: selecting DAs for the shared DA library from DAs in an end user's personal DA library based on predetermined sharing automation rules; automatically selecting a recently captured DA or soon to be captured DA for the shared DA library based on a sharable DA trigger and/or predetermined sharing automation rules; and initiating or updating a camera interface to be in a share mode that automatically designates new DAs for the shared DA library.

In different scenarios, the selection of DAs for a shared DA library may occur as a response to automatic sharing options and/or suggested sharing options during an onboarding interval, a near-live interval, and/or a deferred interval. The "onboarding interval" refers to an interval that follows an end-user establishing a shared DA library for the first time. During the onboarding interval, smart sharing options may be used to select which DAs in the personal DA library of an end-user will be transferred to the shared DA library. Also, smart sharing policies or preferences for future DAs may be selected by an end-user during the onboarding interval. The "near-live" interval refers to an interval that occurs while (or soon after) an end-user is using the camera interface of an end-user device. During each near-live interval, sharable DA triggers and/or sharable context metrics are identified and related smart sharing options may be used to select which recently captured DAs and/or soon to be captured DAs will be transferred to a shared DA library. The "deferred interval" may refer to an interval that follows an end-user device being plugged into a power supply, connected to or synchronized with another device, after the passage of a determined amount of time, etc. (e.g., at the end of each day). During each deferred interval, extended sharable DA triggers and/or extended sharable context metrics are identified and related smart sharing options may be used to select which previously captured DAs or previously obtained DAs (e.g., DAs downloaded or received from another device) will be transferred to the shared DA library.

During the onboarding interval, the near-live interval, and the deferred interval, the smart sharing options available may vary over time as new information becomes available regarding an end-user's preferences and camera use. The smart sharing options may also account for privacy considerations (e.g., secure storage options and/or encryption/decryption options) for DAs, sharing preferences, sharable context metrics, sharing policies and settings, sharable DA trigger instructions, etc.) and end-user customization. Based on the smart sharing options and sharable DA triggers, the shared DA library will be populated with DAs appropriate for a given shared DA library. For different shared DA libraries (e.g., family, friends, work groups, or associations), the smart sharing options and sharable DA triggers may vary.

Without limitation, an example method of selecting DA for a shared DA library includes: initiating, by an end-user device of a first participant of the shared DA library, a camera session; identifying, by the end-user device, a sharable DA trigger; capturing, by a camera of the end-user device, a DA during the camera session after identifying the sharable DA trigger; and selecting, by the end-user device, the captured DA for the shared DA library based on the identified sharable DA trigger. Without limitation, examples of the sharable DA trigger include: detecting a second participant of the shared DA library as being within a target proximity of an end-user device; receiving a signal from the second participant's end-user device; an end-user selecting a sharing option displayed during the camera session; an end-user selecting a sharing option displayed during a previous camera session; an end-user selecting a sharing schedule (e.g., a sharing start-time and a sharing end-time); and/or identifying that the end-user device is located at a significant location.

BRIEF DESCRIPTION OF THE DRAWINGS

Embodiments described herein are illustrated by examples and not limitations in the accompanying drawings, in which like references indicate similar features. Furthermore, in the drawings, some conventional details have been omitted, so as not to obscure the inventive concepts described herein.

DETAILED DESCRIPTION

Figure 1:
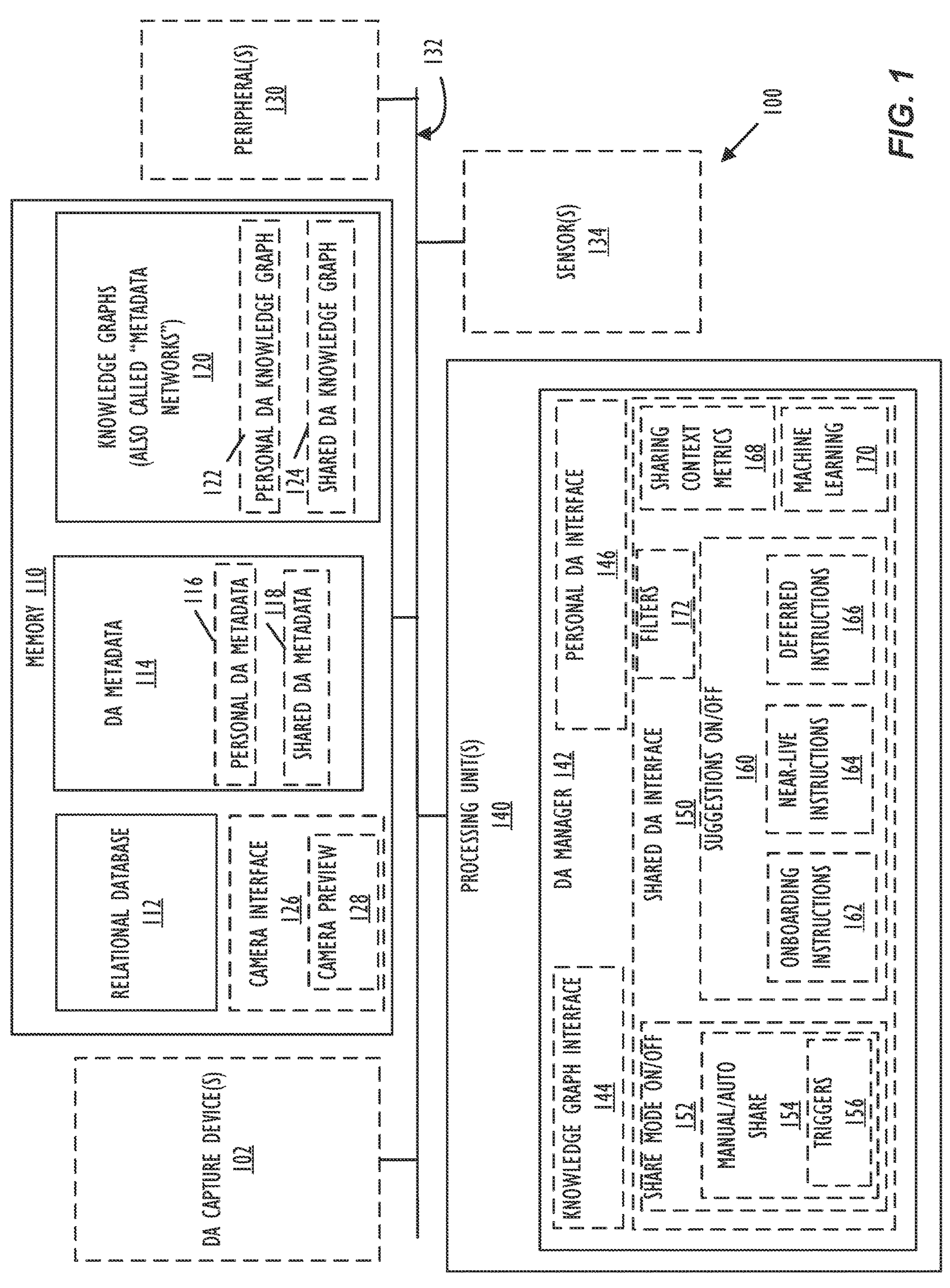
FIG. 1 illustrates, in block diagram form, a digital asset (DA) management system that includes electronic components for performing DA management that includes smart sharing options for populating a shared DA library in accordance with an embodiment.

Described herein are methods, end-user devices, computer-readable mediums, and systems to provide smart sharing options for populating a shared digital asset (DA) library. With the described smart sharing options, sharable DAs are automatically identified or suggested to an end-user. As more information becomes available through end-user customization, end-user feedback to suggestions, sharable DA triggers, DA analysis, and/or detectable context metrics, smart sharing options may become more automated with minimal additional input by an end-user. Without limitation, local signal reception (e.g., Bluetooth® or other short-range signaling) between end-user devices related to a shared DA library is one type of information that can be used with smart sharing options. As an option, the smart sharing options may include override options to enable a user to temporarily override (e.g., until the end of the day or another time interval) established smart sharing settings for the end-user (e.g., by turning the share mode on/off setting to oft).

In different example embodiments, the smart sharing options may vary over time depending on the source of DAs, the relative priority of DAs, the battery condition, the plugged-in condition of an end-user device, and/or other factors. Without limitation, the intention of the smart sharing options is to facilitate the process of populating a shared DA library initially as well as over time while accounting for different end-user preferences, privacy considerations, different camera uses, different end-user device conditions, and/or other variations. The smart sharing options described herein could be combined in different ways at different moments for a given end-user With the smart sharing options, DAs are transferred from a personal DA library (or another available library) to the shared DA library. As needed, some queueing of DAs to be transferred to the shared DA library can be performed. Also, some quality filters and/or duplication prevention filters may be applied to avoid populating the shared DA library with DAs that fall below a quality metric (e.g., blurry, bad lighting, duplicate, etc.). Once the shared DA library is populated or updated, the DAs are available to all participants of the shared DA library. In some example embodiments, the shared DA library is a subscription option available on a cloud-based platform. In different example embodiments, an end-user may have a single shared DA library or multiple DA libraries. For each shared DA library, the amount of total storage available for the shared DA library may vary. Also, the smart sharing options may vary for each type of shared DA library (e.g., family, friends, work groups, or associations). In some example embodiments, the smart sharing options will account for the different types of shared DA libraries with the goal being to populate each shared DA library with the correct DAs with minimal end-user input. To accomplish this goal, more end-user feedback or preferences may initially be considered. As more information becomes available over time (e.g., from periodic end-user feedback to suggestions, DA analysis, knowledge graph analysis, sharable DA triggers, detectable context metrics, etc.) machine learning algorithms may fine-tune smart sharing options for each end-user and each shared DA library.

Terminology

In order to enhance understanding of this disclosure and the various embodiments discussed, non-limiting explanations of various terms used in this disclosure are provided below.

Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

The term "digital asset" (DA) refers to data/information which is bundled or grouped in such a way as to be meaningfully rendered by a computational device for viewing, reading, and/or listening by a person or other computational device/machine/electronic device. Digital assets can include photos, recordings, and data objects (or simply "objects"), as well as video files and audio files. Image data related to photos, recordings, data objects, and/or video files can include information or data necessary to enable an electronic device to display or render images (such as photos) and videos. Audiovisual data can include information or data necessary to enable an electronic device to present videos and content having a visual and/or auditory component.

The term "primary DAs" refers to DAs captured using native sensors (e.g., cameras, microphone, etc.) of an end-user device, external sensors coupled to the end-user device (e.g., an external web camera, specialty camera, etc.), or DAs obtained from trusted sources associated with the user (e.g., the DA library of the user's cloud account; the DA library of the user's computer, laptop, or other display device; direct imports from cameras, memory cards, scanners or other devices; imports from end-user devices that are previously identified as a trusted source by a user; and/or any other trusted sources).

The term "secondary DAs" refers to DAs captured by another end-user device and received later by a given end-user device (e.g., via a wired or wireless communication interface). Secondary DAs may alternatively be termed "external DAs" or "guest DAs". Secondary DAs are received by the end-user device from other users' devices via a wired or wireless communication interface, or from other secondary sources (e.g., any application on the end-user device which can receive DAs; the DA library of another user's end-user device; imports from end-user devices that are not previously identified as a trusted source by a user).

The term "personal DAs" refers to DAs stored in an end-user's personal DA library regardless of source.

The term "shared DAs" refers to DAs stored in a participant's shared DA library regardless of source.

The term "DA management" refers to methods and procedures for managing DAs. A DA management system is thus a system for managing DAs.

The term "personal DA library" refers to a user interface for interacting with personal DAs including photos, videos, enhanced photos (e.g., Apple's Live Photos), songs, or other DAs. As an example, a personal DA library may provide a variety of query, organization, and featured DA options for primary DAs by default. Secondary DAs become linked to the primary DA library after a syndication process subject to eligibility filters. In different scenario, DAs in the personal DA library may be stored locally, at a server, or a combination thereof. In some scenarios, users with a DA library "cloud storage" option turned on for their user account may have most of the high/full-resolution versions of their personal DA library stored in cloud storage, while lower resolution thumbnail versions of the images are stored locally on the end-user device by default unless or until a higher-resolution version of such images are requested by the end-user's device. For example, as a user scrolls through or accesses certain photos, the full-resolution versions of the DAs can be being downloaded in the background, so that, when a user clicks on the thumbnail, the full-resolution versions of the DAs appear.

The term "shared DA library" refers to a user interface for interacting with shared DAs including photos, videos, enhanced photos (e.g., Apple's Live Photos), songs, or other DAs. As an example, a shared DA library may provide a variety of query, organization, and featured DA options. In different scenario, DAs in the shared DA library may be stored locally, at a server, or a combination thereof. In some scenarios, users with a DA library "cloud storage" option turned on for their user account may have most of the high/full-resolution versions of their personal DA library stored in cloud storage, while lower resolution thumbnail versions of the images are stored locally on the end-user device by default unless or until a higher-resolution version of such images are requested by the end-user's device. For example, as a user scrolls through or accesses certain photos, the full-resolution versions of the photos can be being downloaded in the background, so that, when a user clicks on the thumbnail, the full-resolution versions of the photos appear.

The term "sharable DA trigger" refers to any predetermined or live signal or value that indicates a DA is sharable. Some sharable DA triggers may be based on end-user input or end-user preferences (e.g., selection of menu-based options or responses to suggestions, a user toggling a share mode, a user selecting automatic sharing based on face identification, end-user device location relative to a significant location, or other measurable parameters, etc.). Even when a sharable DA trigger is based on user-input or user preferences, the sharable DA trigger may occur later when a particular signal or parameter (or a related value relative to a threshold) is detected. Some sharable DA triggers are automated and do not need to rely on user-input or user preferences. For example, some sharable DA triggers may involve measuring or detecting available signals or parameters (or related values relative to respective thresholds) without user-input or user preferences. In such cases, automatic sharable DA triggers are still intended to comply with reasonable rules for automating DA sharing and privacy while reducing the amount of end-user input.

The term "sharable context metric" refers to a value or score used to indicate a likelihood that a DA is sharable. A sharable context metric could be as simple as a binary indication (e.g., yes or no, or a signal detected or not detected) and/or may involve statistical analysis or machine-learning related to many available context parameters. Example context parameters that could be considered when determining a sharable context metric includes people detection, location detection, trip detection, signification location detection, event detection, previous DA shares and related parameters, etc.

The term "syndication library" refers to a DA interface separate from the personal DA library or shared DA library. The syndication library stores secondary DAs, which are subject to eligibility filters before becoming linked with a personal DA library.

The term "change," when used as a verb, refers to: making the form, nature, content, future course, etc., of (something) different from what it is or from what it would be if left alone; transforming or converting; and substituting another or others. "Change" includes becoming different, altered and/or modified. When used as a noun, "change" includes the act or fact of changing; fact of being changed; a transformation or modification; alteration; a variation or deviation.

The term "detect" means to notice, note, identify by a computational device such as by one or more processors, either mediately (e.g., via one or more coupled sensors, other devices) or immediately. For example, a system can detect that information in a database has been changed (e.g., updated, revised, altered, or overwritten).

The term "data" refers to information which can be stored by a computer memory. Digital data can be notionally grouped with other digital data to form a DA. Data can include media assets and "image data."

The term "data object" can be a variable, a data structure, a function, or a method, and a value in computer-readable memory referenced by an identifier. "Data object" or just "object" can refer to a particular instance of a class, where the object can be a combination of variables, functions, and data structures. An object can be a table or column, or an association between data and a database entity (such as relating a person's age to a specific person); an object can thus be a constellation of data describing, for example, a person or an event, or series of events.

The term "computational intensity" refers to the number of computations and/or the amount of time required to perform one or more operations. An operation can be computationally intense or computationally expensive when it would take a relatively large amount of time and/or large number of calculations or computations to carry out the operation.

The expression "modifying information" includes changing, deleting, adding and moving information or data within data storage units, such as databases and computer memory.

The term "electronic device," (or simply "device") includes servers, mobile electronic devices such as smart phones, laptop computers, personal computers and tablet computers. These mobile electronic devices are examples of end-user devices.

The term "coupled" refers to components or devices which are able communicate or interact with one another, either directly or indirectly. All connected elements are coupled, but not all coupled elements are connected. Coupled elements include those which are able to communicate with each other.

The terms "determine" and "determination" include, by way of example, calculations, evaluations, ascertainments, confirmations and computations, as well as computations/calculations necessary to make an evaluation, confirmation, ascertainment, or discernment, performed by a computing device, such as a processor. Thus, for example, making a determination as to whether to translate a change in data into one or more modification instructions will involve one or more computations and/or calculations.

The term "knowledge graph" (also called "metadata network") refers to a data structure with nodes and edges. "Node" is a synonym for "vertex." Vertices of graphs are often considered to be atomistic objects, with no internal structure. An edge is (together with vertices) one of the two basic units out of which graphs are constructed. Each edge has two (or in hypergraphs, more) vertices to which it is attached, called its endpoints. Edges may be directed or undirected; undirected edges are also called lines and directed edges are also called arcs or arrows. In an undirected simple graph, an edge may be represented as the set of its vertices, and in a directed simple graph it may be represented as an ordered pair of its vertices. An edge that connects vertices x and y is sometimes written xy.

A knowledge graph according to this disclosure can be a graph database. A graph database is a database that uses graph structures for semantic queries with nodes, edges and properties to represent and store data. A key concept of the system is the graph (or edge or relationship), which directly relates data items in a store, (such a relational database). The relationships allow data in the store to be linked together directly, and in many cases retrieved with one operation. Graph databases are based on graph theory, and employ nodes and edges. Graph databases enable simple and fast retrieval of complex hierarchical structures that are difficult to model in relational systems. A knowledge graph allows data elements to be categorized for large scale easy retrieval.

Within the knowledge graph, "nodes" represent entities such as people, businesses, accounts, events, locations or any other item to be tracked. "Edges," also termed graphs or relationships, connect nodes to other nodes. Edges represent a relationship between nodes. Meaningful patterns emerge when examining the connections and interconnections of nodes, properties, and edges. Edges are key to the knowledge graph, as they represent an abstraction that is not directly implemented in other systems, such a relational database. A change a relational database can necessitate the need to add, delete, or modify one or more nodes and edges in a related knowledge graph. For the described DA management systems, one or more knowledge graphs may be used before, during, and after smart sharing operations to handle primary DA, secondary DA, personal DA, and shared DA management options.

The term "relational database" refers to databases that gather data together using information in the data. Relational databases do not inherently contain the idea of fixed relationships between data items, (also called "records"). Instead, related data is linked to each other by storing one record's unique key in another record's data. A relational system may have to search through multiple tables and indexes, gather large amounts of information, and then sort the information to cross-reference data items. In contrast, graph databases directly store the relationships between records.

Described herein are methods, end-user devices, computer-readable mediums, and systems to provide smart sharing options for populating a shared DA library. Example smart sharing options include: sharing automation options; sharing suggestion options; and sharing policies based on user input. The sharing automation options and/or the sharing suggestion options may be based on sharable DA triggers (e.g., location, time, detection of nearby end-users or related end-user devices), DA analysis (e.g., facial recognition, metadata analysis, and/or knowledge graph analysis), sharable context metrics (e.g., determine a likelihood that an existing DA, a new DA, or a soon to be captured DA is a sharable DA), and/or previous user input. Over time, machine learning techniques may be applied to fine-tune the sharing automation options and/or the sharing suggestion options in a manner that eventually reduces the amount of input received from an end-user (i.e., sharing automation can theoretically be achieved once end-user sharing preferences and camera use are better understood and accounted for).

In some example embodiments, the selection of DAs to populate a shared DA library may occur as a response to automatic sharing options and/or suggested sharing options during an onboarding interval, near-live intervals, and/or deferred intervals. The onboarding interval refers to an interval that follows an end-user establishing a shared DA library for the first time. During the onboarding interval, smart sharing options may be used to select which DAs in the personal DA library of an end-user will be transferred to the shared DA library. Also, smart sharing policies or preferences for future DAs may be selected by an end-user during the onboarding interval. The near-live interval refers to an interval that occurs while (or soon after) an end-user is using the camera interface of an end-user device. During each near-live interval, sharable DA triggers and/or sharable context metrics are identified and related smart sharing options may be used to select which recently captured DAs and/or soon to be captured DAs will be transferred to a shared DA library. The deferred interval refers to an interval that follows a predetermined amount of time passing or the end-user device being placed in a predetermined state or condition, e.g., an end-user device being plugged into a power supply, the end-user device being plugged into and/or synchronizing with another device, a certain time at the end of each day or week, etc. During each deferred interval, extended sharable DA triggers and/or extended sharable context metrics are identified and related smart sharing options may be used to select which previously captured DAs or previously obtained DAs (e.g., DAs downloaded or received from another device) will be transferred to the shared DA library. In some example embodiments, the deferred interval may include new syndication operations in which eligible secondary DAs obtained (e.g., via download, receipt of messages with DAs) since the last syndication operation occurred become primary DAs (e.g., based on application of eligibility filters). Once syndication is complete, smart sharing options may be performed on any new additions to the personal DA library (whether through the syndication process or through DA capture operations). In some example embodiments, the deferred interval occurs while an end-user device is plugged in and otherwise inactive (e.g., while an end-user sleeps)

Over time, the smart sharing options available may vary over time as new information becomes available regarding an end-user's preferences and camera use. The smart sharing options may also account for privacy considerations (e.g., secure storage options and/or encryption/decryption options) for DAs, sharing preferences, sharable context metrics, sharing policies and settings, sharable DA trigger instructions, etc.) and end-user customization.

In some example embodiments, syndication operations and/or smart sharing options involve: 1) updating a knowledge graph associated with a personal DA library, a shared DA library, and/or a syndication library; or 2) linking multiple knowledge graphs (e.g., a first knowledge graph associated with a personal DA library having primary DAs, a second knowledge graph associated with a shared DA library, and/or a third knowledge graph associated with a syndication library having secondary DAs). Once DAs are linked with the personal DA library or shared DA library, they become searchable. Also, the updated knowledge graph or linked knowledge graphs enable DAs to be compatible with organization and featured DA options of the personal DA library and/or shared DA library. In different example embodiments, the eligibility filters used to syndicate secondary DAs with the personal DA library of an end-user device may vary. Without limitation, the eligibility filters may apply filters to secondary DAs based on an aesthetic quality metric, a text or meme exclusion metric, a file type filter, a workplace eligibility filter, matching secondary DA identifiers with DA identifiers already associated with the personal DA library, matching of secondary DA metadata identifiers with DA metadata identifiers already associated with the personal DA library, or other filtration options.

Embodiments set forth herein can assist with improving automatic analysis and determination of sharable DAs based on their content or the context in which they were/are captured. Some embodiments of this disclosure are based in object-oriented programming (OOP). OOP refers to a programming paradigm based on the concept of "objects," which may contain data, in the form of fields, often known as attributes. Objects can contain code, in the form of procedures, often known as methods. A feature of objects is that an object's procedures can access and often modify the data fields of the object with which they are. Within OOP schema, a type is a category. A type is an object with a size, a state, and a set of abilities. Types are defined in order to model a problem to be solved. A class is a definition of a new type, that is, types are made by declaring a class. A class is a collection of variables combined with a set of related functions. Other classes and functions can use a class. Member variables are variables in a class. OOP languages can be class-based, meaning that objects are individual instances of classes, which typically also determine their type.

Substantial computational resources may be needed to manage the DAs in a DA collection (e.g., processing power for performing queries or transactions, computer-readable memory space for storing the necessary databases, etc.). Due to limited storage capacity, DA management for an end-user device may be provided by a remote device (e.g., an external data store, an external server, etc.), where copies of the DAs are stored, and the results are transmitted back to the end-user device having limited storage capacity.

Thus, according to some DA management embodiments, a "knowledge graph" (also referred to herein as a "metadata network") associated with a collection of digital assets (i.e., a DA collection) is used. The knowledge graph can comprise correlated "metadata assets" describing characteristics associated with DAs. Each metadata asset can describe a characteristic associated with one or more digital DAs in the DA collection. For example, a metadata asset can describe a characteristic associated with multiple DAs in the DA collection, such as the location, day of week, event type, etc., of the one or more associated DAs. Each metadata asset can be represented as a node in the metadata network. A metadata asset can be correlated with at least one other metadata asset. As noted above, correlations between metadata assets can be represented as an edge in the metadata network that is between the nodes representing the correlated metadata assets. According to some embodiments, a knowledge graph may define multiple types of nodes and edges, e.g., each with their own properties, based on the needs of a given implementation.

FIG. 1 illustrates, in block diagram form, a DA management system 100 that includes electronic components for performing DA management that includes providing smart sharing options of secondary DAs with the personal DA library of an end-user device in accordance with one or more embodiments described in this disclosure. The system 100 can be housed in single end-user device, such as a desktop computer system, a laptop computer system, a tablet computer system, a server computer system, a mobile phone, a media player, a personal digital assistant (PDA), a personal communicator, a gaming device, a network router or hub, a wireless access point (AP) or repeater, a set-top box, or a combination thereof. Components in the system 100 can be spatially separated and implemented on separate computing systems that are connected by the communication mechanism 132, as described in further detail below.

For one embodiment, the system 100 may include processing unit(s) 140, computer-readable memory 110, DA capture device(s) 102, sensor(s) 134, and peripheral(s) 130. For one embodiment, one or more components in the system 100 may be implemented as one or more integrated circuits (ICs). For example, at least one of the processing unit(s) 140, the communication mechanism 132, the DA capture device(s) 102, the peripheral(s) 130, the sensor(s) 134, or the computer-readable memory 110 can be implemented as a system-on-a-chip (SoC) IC, a three-dimensional (3D) IC, any other known IC, or any known IC combination. For another embodiment, two or more components in the system 100 are implemented together as one or more ICs. For example, at least two of the processing unit(s) 140, the communication mechanism 132, the DA capture device(s) 102, the peripheral(s) 130, the sensor(s) 134, or the computer-readable memory 110 are implemented together as a SoC IC. Each component of system 100 is described below.

As shown in FIG. 1, the system 100 can include processing unit(s) 140, such as CPUs, GPUs, other integrated circuits (ICs), computer memory, and/or other electronic circuitry. For one embodiment, the processing unit(s) 140 manipulate and/or process DA metadata 114 associated with DAs or optional data associated with DAs (e.g., data objects reflecting one or more persons, places, and/or events associated with a given DA, etc.). The processing unit(s) 140 may include a DA manager 142 for performing one or more embodiments of DA management, as described herein. For one embodiment, the DA manager 142 is implemented as hardware (e.g., electronic circuitry associated with the processing unit(s) 140, circuitry, dedicated logic, etc.), software (e.g., one or more instructions associated with a computer program executed by the processing unit(s) 140, software run on a general-purpose computer system or a dedicated machine, etc.), or a combination thereof.

The DA manager 142 can enable the system 100 to generate and use knowledge graphs 120 of the DA metadata 114 as a multidimensional network. Knowledge graphs 120 and multidimensional networks that may be used to implement the various techniques described herein are described in further detail in U.S. Non-Provisional patent application Ser. No. 15/391,269, entitled "Notable Moments in a Collection of Digital Assets," filed Dec. 27, 2016, and hereby incorporated by reference herein.

In one embodiment, the DA manager 142 can perform one or more of the following operations: (i) generate the knowledge graphs 120; (ii) relate and/or present at least two DAs, e.g., as part of a moment, based on the knowledge graphs 120; (iii) determine and/or present interesting DAs in the DA collection to the user as sharing suggestions, based on the knowledge graphs 120 and one or more other criterion; (iv) select and/or present suggested DAs to share with one or more third parties (e.g., based on a contextual analysis); and select and/or present DAs for linkage or inclusion with a shared DA library.

Over time, the DA manager 142 obtains or receives a collection of DA metadata 114 including personal DA metadata 116 and shared DA metadata 118. The personal DA metadata 116 and the shared DA metadata 118 may be stored separately at least initially. The related storage locations may be spatially or logically separated as is known. As used herein, "metadata," "digital asset metadata," "DA metadata," and their variations collectively refer to information about one or more DAs. Metadata can be: (i) a single instance of information about digitalized data (e.g., a time stamp associated with one or more images, etc.); or (ii) a grouping of metadata, which refers to a group comprised of multiple instances of information about digitalized data (e.g., several time stamps associated with one or more images, etc.). There may also be many different types of metadata associated with a collection of DAs. Each type of metadata (also referred to as "metadata type") describes one or more characteristics or attributes associated with one or more DAs. Further detail regarding the various types of metadata that may be stored in a DA collection and/or utilized in conjunction with a knowledge graphs are described in further detail in U.S. Non-Provisional patent application Ser. No. 15/391,269, which was incorporated by reference above.

As used herein, "context" and its variations refer to any or all attributes of a user's device that includes or has access to a DA collection associated with the user, such as physical, logical, social, and other contextual information. As used herein, "contextual information" and its variations refer to metadata that describes or defines a user's context or a context of a user's device that includes or has access to a DA collection associated with the user. Exemplary contextual information includes, but is not limited to, the following: a predetermined time interval; an event scheduled to occur in a predetermined time interval; a geolocation visited during a particular time interval; one or more identified persons associated with a particular time interval; an event taking place during a particular time interval, or a geolocation visited during a particular time interval; weather metadata describing weather associated with a particular period in time (e.g., rain, snow, sun, temperature, etc.); season metadata describing a season associated with the capture of one or more DAs; relationship information describing the nature of the social relationship between a user and one or more third parties; or natural language processing (NLP) information describing the nature and/or content of an interaction between a user and one more third parties. For some embodiments, the contextual information can be obtained from external sources, e.g., a social networking application, a weather application, a calendar application, an address book application, any other type of application, or from any type of data store accessible via a wired or wireless network (e.g., the Internet, a private intranet, etc.).

Referring again to FIG. 1, for one embodiment, the DA manager 142 uses the DA metadata 114 to generate knowledge graphs 120. As shown in FIG. 1, all or some of the knowledge graphs 120 can be stored in the processing unit(s) 140 and/or the computer-readable memory 110. The knowledge graphs 120 include a personal DA knowledge graph 122 and a shared DA knowledge graph 124. Each of the personal DA knowledge graph 122 and the secondary DA knowledge graph 124 includes dynamically organized collections of metadata describing one or more DAs (e.g., one or more groups of DAs in a DA collection, one or more DAs in a DA collection, etc.) used by one or more computer systems. In the knowledge graphs 120, there are no actual DAs stored—only metadata (e.g., metadata associated with one or more groups of DAs, metadata associated with one or more DAs, etc.). The knowledge graphs 120, differ from databases because, in general, knowledge graphs 120 enable deep connections between metadata using multiple dimensions, which can be traversed for additionally deduced correlations. This deductive reasoning generally is not feasible in a conventional relational database without loading a significant number of database tables (e.g., hundreds, thousands, etc.). Compared to conventional databases, the knowledge graphs 120 may be viewed, operated, and/or stored using fewer computational resources. Furthermore, the knowledge graphs 120 are dynamic resources that have the capacity to learn, grow, and adapt as new information is added to them. This is unlike databases, which are useful for accessing cross-referred information. While a database can be expanded with additional information, the database remains an instrument for accessing the cross-referred information that was put into it. The knowledge graphs 120 do more than access cross-referenced information—they go beyond that and involve the extrapolation of data for inferring or determining additional data. As alluded to above, the DAs themselves may be stored, e.g., on one or more servers remote to the system 100, with thumbnail versions of the DAs stored in the computer-readable memory 110 and full versions of particular DAs only downloaded and/or stored to the computer-readable memory 110 as needed (e.g., when the user desires to view or share a particular DA). In other embodiments, however, e.g., when the amount of onboard storage space and processing resources of the system 100 is sufficiently large and/or the size of the user's DA collection is sufficiently small, the DAs themselves may also be stored within computer-readable memory 110, e.g., in a separate database, such as in one or more relational databases.

The DA manager 142 may generate the knowledge graphs 120 as a multidimensional network of the DA metadata 114. As used herein, a "multidimensional network" and its variations refer to a complex graph having multiple kinds of relationships. A multidimensional network generally includes multiple nodes and edges. For one embodiment, the nodes represent metadata, and the edges represent relationships or correlations between the metadata. Exemplary multidimensional networks include, but are not limited to, edge-labeled multigraphs, multipartite edge-labeled multigraphs, and multilayer networks.

In one embodiment, the knowledge graphs 120 includes two types of nodes—(i) moment nodes; and (ii) non-moments nodes. As used herein, a "moment" refers a single event (as described by an event metadata asset) that is associated with one or more DAs. For example, a moment may refer to a visit to coffee shop in Cupertino, California that took place on Mar. 26, 2018. In this example, the moment can be used to identify one or more DAs (e.g., one image, a group of images, a video, a group of videos, a song, a group of songs, etc.) associated with the visit to the coffee shop on Mar. 26, 2018 (and not with any other event).

As used herein, a "moment node" refers to a node in a multidimensional network that represents a moment (as is described above). As used herein, a "non-moment node" refers a node in a multidimensional network that does not represent a moment. Thus, a non-moment node may refer to a metadata asset associated with one or more DAs that is not a moment (i.e., not an event metadata asset).

For one embodiment, the edges in the knowledge graphs 120 between nodes represent relationships or correlations between the nodes. For one embodiment, the DA manager 142 updates the knowledge graphs 120 as it obtains or receives new DA metadata 114 and/or determines new DA metadata 114 for the DAs in the end-user's DA collection.

The DA manager 142 can manage DAs associated with the DA metadata 114 using the knowledge graphs 120 in various ways. In some example embodiments, the DA manager 142 may include a knowledge graph interface 144, a personal DA interface 146, and a shared DA interface 150 to leverage the knowledge graphs 120 to identify and present interesting groups of one or more DAs in a DA collection based on the correlations (i.e., the edges in the knowledge graphs 120) between the DA metadata 114 (i.e., the nodes in the knowledge graphs 120) and one or more criterion. For this first example, the DA manager 142 may select the interesting DAs based on moment nodes in the knowledge graphs 120. In some embodiments, the DA manager 142 may suggest that a user shares the one or more identified DAs with one or more third parties. For a second example, the DA manager 142 may use the knowledge graphs 120 and other contextual information gathered from the system (e.g., the user's relationship to one or more third parties, a topic of conversation in a messaging thread, an inferred intent to share DAs related to one or moments, etc.) to select and present a representative group of one or more DAs that the user may want to share with one or more third parties.

In some example embodiments, the various options related to the knowledge graphs 120 vary for the personal DA knowledge graph 122 versus the shared DA knowledge graph 124. Specifically, the personal DA interface 146 of the DA manager 142 is configured to use the personal DA knowledge graph 122 for operations related to the personal DA library. In contrast, the shared DA interface 150 of the DA manager 142 is configured to use the shared DA knowledge graph 124 for operations related to the shared DA library.

As shown, the shared DA interface 150 includes a share mode on/off setting 152, which may be controlled by a toggle (e.g., button selection) in one or more interfaces (e.g., the camera interface 126 or an operating system interface). When the share mode is selected, a related manual/automatic share setting 154 may be selected based on end-user input (e.g., another toggle button) and/or triggers 156. The triggers 156 may be used to switch between a manual share setting and an automatic share setting. In some example embodiments, various triggers 156 (e.g., device location, device proximity to other devices, trip identification, etc.) are possible and may be used to determine sharing context metrics 168. For example, the sharing context metrics 168 may be used to determine a numeric value or score used to decide whether the automatic share setting should be on or off. The sharing context metrics 168 may also be used to filter shared DA suggestions related to the suggestions on/off setting 160. When the suggestions on/off setting 160 is turned on, suggestions options are categorized as onboarding instructions 162, near-live instructions 164, and deferred instructions 156. The onboarding instructions 162 handle smart sharing suggestions during an onboarding interval. The near-line instructions 164 handle smart sharing suggestions during each near-live interval. The deferred instructions 156 handle smart sharing suggestions during each deferred interval.

In some example embodiments, the shared DA interface 150 is also configured to apply filters 172 to available DAs. Example filters 172 may eliminate blurry DAs, GIFs, PDFs, and other non-image/video file types (e.g., only certain file types may be considered as eligible for the shared DA library) from consideration for the shared DA library. Also, the filters 172 may perform a semantical "de-duping" operation to avoid duplication (to within some measure of similarity) of DAs eligible for the shared DA library. As another option, the filters 172 deem some DAs as ineligible for the shared DA library based on location relative to a significant location (e.g., away from home or another significant location, etc.).

In some example embodiments, sharable DA suggestions involve analyzing the personal DA knowledge graph 122 and/or the shared DA knowledge graph 124 (e.g., to determine if personal DAs are related to shared DAs already in the shared DA library). DAs that pass the filters 172 and/or DAs that are identified by the sharable DA suggestion operations may be considered as eligible for smart sharing options. As desired, eligible DAs may be grouped by time/location/sender, or other grouping criteria. At this point, the eligible DAs are associated with or linked to further operations of the shared DA interface 150.

There are different options for how eligible DAs may be associated with the shared DA library (e.g., displayed in the shared DA library, and available for query, organization, and featured DA options of the shared DA library). In a first option, the shared DA knowledge graph 124 is updated to include information regarding the eligible DAs. In a second option, the shared DA knowledge graph 124 is updated to identify eligible DAs and a link is provided between the personal DA knowledge graph 122 and the shared DA knowledge graph 124. Regardless of the particular technique used, the smart sharing options enable the eligible DAs to be associated with the shared DA library and its related query, organization, and featured DA options.

In some example embodiments, DAs of the end-user of an end-user device may be automatically considered to be eligible DAs for the shared DA library. In some example embodiments, a knowledge graph for the personal DA library is used to identify that a DA includes an end-user's image because the user linked their "Me" contact to their shared DA library. As another option, a knowledge graph may be able to infer who the owner is without explicit end-user actions. In this case, a person node of the knowledge graph may be used to infer the identity of the end-user.

In some example embodiments, DAs of an end-user's children may automatically be considered to be eligible DAs for the shared DA library. Similar to identifying a user, a knowledge graph may be used to explicitly or implicitly identify the end-user's children. As another option, a parent's DAs can be sourced from a child's personal DAs. In such case, separate knowledge graphs of both the parent and child can be made aware of each other to inform smart sharing options.

In some example embodiments, DAs with matching time and location to moments already identified in the shared DA library are deemed eligible DAs for the shared DA library. This sharable DA suggestion option is intended to identify DAs from locations where the end-user was present, and allow completion of a corresponding Memory in the shared DA library.

In some example embodiments, DAs with matching time and device location within a time interval (e.g., the last month) are deemed eligible DAs for the shared DA library. This sharable DA suggestion option leverages location data and is intended to identify DAs from locations where the end-user has recently been. Along with the location data, a DAs data/location is used to determine if there is a match to within an acceptable tolerance between end-user device location/data and DA location/data. One example scenario for this sharable DA suggestion relates a group setting (e.g., a lunch with colleagues) in which the user was present at the location and thus DAs with or without the user visible are deemed eligible.

In some example embodiments, DAs with matching time and person relative to moments in the shared DA library may be deemed eligible DAs for the shared DA library. This sharable DA suggestion option is intended to identify DAs of relevant people and Memories that are already in the shared DA library. Not only does the person need to be present in the shared DA library, but the person should also be present in the same moment in time. For example, a DA of a best friend from two years ago will not automatically be deemed eligible unless other photos of the best friend from the same moment are already present in the shared DA library.

In some example embodiments, DAs with matching time and pet to a moment already in the shared DA library are deemed eligible DAs for the shared DA library. This sharable DA suggestion option is intended to identify DAs of pets related to moments that are already in the shared DA library. Note: since DAs do not have the complete context of the shared DA library and its associated shared DA knowledge graph 124, matching people/pets of DAs with people/pets already in the shared DA library may rely on facial recognition and matching.

Once eligible DAs are identified and linked to the shared DA library via a smart sharing option, curation queries of the shared DA library may include the eligible DAs. In some example embodiments, eligible DAs are not promoted for use as cover photos for Memories (unless there is no other option) of a shared DA library, but a Memory can include these eligible DAs. As desired, eligible DAs are also selectable as a featured DA of the shared DA library.

In addition to participating in the regular experience of building/curating Memories, the including of eligible DAs in the shared DA library can act as a trigger or request to find or construct a contextually relevant Memory for immediate display to one or more participants of the shared DA library. For content like Memories, albums, other DA collections, which may include eligible DAs, an end-user may be prompted to save the DAs into the shared DA library before the respective DAs are shared with others or synced to other devices in another way.

Together the quality filtration stage, sharable DA suggestion options, automated sharing options, and/or other smart sharing options find relevant DAs for the shared DA library. While DAs captured by an end-user device are more likely to include sharable DAs, the described DA management system 100 may discover sharable DAs within texting/messaging applications of an end-user device, including third-party applications with messaging features.

In some example embodiments, the shared DA interface 150 includes machine learning instructions 170 configured to perform machine learning operations based on available information related to sharing feedback, sharing preferences of an end-user, and/or camera use metrics. Over time, as more information is obtained (from an end-user, from the sharing context metrics 168, the triggers 156 and/or other sources of information), automatic sharing settings used when the share mode setting 152 is on may be adjusted to account for machine learning results.

In some example embodiments, the shared DA interface 150 is configured to provide frictionless sharing (e.g., an automatic experience in the camera interface 126 and broader suggestions offered to the end-user in the personal DA library). In some example embodiments, the camera interface 126 includes a new toggle (e.g., during a camera preview 128) with two modes: a personal mode; and a share mode (related to the share mode on/off setting 152). An end-user can manually switch between the two modes while in the camera interface 126 (e.g., during the camera preview 128) or an operating system menu as desired by tapping on a related button.

As another option, multiple settings are possible for when the share mode is on (whether selected within the camera interface 126 or another location of smart sharing settings). Example share mode on settings include: a share manually setting and a share automatically setting (related to the manual/automatic share setting 154). If the share manually setting is selected, an end-user can manually select whether to share a captured DA (smart sharing options and related automation are turned off) within the camera interface 126 (e.g., during a camera session) or within the personal DA library. If the share automatically setting is selected, selection of DAs to be shared is automated based on smart sharing options (e.g., previous feedback to suggestions, ongoing monitoring of the sharing context metrics 168, results of the machine learning instructions 170, etc.). In some example embodiments, the manual sharing or automatic share setting is a "sticky" setting. In other words, the camera interface 126 will launch to the last setting (manual sharing or automatic sharing) selected the end-user selected.

In some example embodiments, when the manual/automatic share setting 154 is set to automatic, a signal scanning process is initiated in response to the camera interface 126 being launched. The signal scanning process is configured to detect nearby end-user devices (e.g., via Bluetooth® signaling or another short-range wireless protocol) during a camera session (e.g., during the camera preview interface 128). In some example embodiments, if a nearby end-user device that is related to a participant of the shared DA library is detected, the share mode on/off setting 152 is set to on and the manual/automatic share setting is set to automatic as needed. Afterwards, DAs captured during the camera session will be automatically shared. If an end-user manually turns off the share mode on/off setting 152 during the camera session, proximity detection is not performed or is ignored.

In some example embodiments, smart sharing options use the location of the end-user device relative to one or more significant locations. As an example, an option "Share when at home" may be enabled or disabled (default). If enabled and the end-user device is at or close to home, proximity detection of other end-user devices may be turned off or ignored. When the option "Share when at home" is enabled, the automatic share setting will be used when the end-user device is within or near the perimeter of the home. Other significant location options are possible. As an option, an end-user may manually turn off the share mode during a given camera session even if at home or another significant location.

In some example embodiments, once the manual/automatic share setting 154 is set, the same setting is used at least for the duration of the camera session. As an option, the manual/automatic share setting 154 may persist for a limited time interval (e.g., 5 minutes) regardless of the number of camera sessions (multiple instances of opening and closing the camera interface 126) that occur. The limited time interval setting may be adjusted by an end-user or may be adjusted based on the end-user's camera use (determined over time via machine learning, end-user feedback, and sharing context metrics). In some example embodiments, when a device is detected at a certain location, the camera interface 126 will keep the automatic share setting for a longer time. As an example, it may be determined that an end-user is current on a trip. As long as the trip context remains, the existing manual/automatic share setting 154 may continue. As an option, an end-user may manually turn off the share mode on/off setting 152 during a given camera session even if the trip context is still valid.

In some example embodiment, the shared DA interface 150 is configured to make smart sharing suggestions to the end-user when the suggestions on/off setting 160 is set to on. The smart sharing suggestions may be based on the sharing context metrics 168 (e.g., the number of triggers 156 detected related to people, activities, and location), DA analysis based on the personal DA knowledge graph 122, DA analysis based on the shared DA knowledge graph 124, and/or other contextual information. In the example of FIG. 1, smart sharing suggestions are managed by the onboarding instructions 162, the near-live instructions 164, and the deferred instructions 166.

The onboarding instructions 162 provide smart sharing suggestions during initial set up of a shared DA library. For example, an end-user may respond to suggestions during the onboarding interval by suggestions by selecting people and a start date. In response, DAs of the personal DA library may be searched to select photos from events and activities containing the selected people. For example, some or all DAs related to a multi-day activity (e.g., a trip) with a selected person or group may be added to the shared DA library. As needed, screenshots and screen recordings are avoided. Also, analysis may be performed to populate a suggested sharable DA list for review by the end-user. Upon review, the end-user may remove any DAs from the suggested list before completing the setup for the shared DA library. Over time, further analysis may be done to improve the selection of DA for the shared DA library (i.e., not all DAs of the personal DA library need by analyzed in order for the shared DA library to be set up).

The near-live instructions 164 provide smart sharing suggestions during a camera session (soon after or even before a new DA is captured during a camera session) of the camera interface 126. In some example embodiments, the near-live instructions 164 perform DA analysis on new DAs and/or soon to be captured DAs during a camera session and provide smart sharing suggestions based on the DA analysis. In some example embodiments, on-demand people recognition may be performed shortly after new DA captures or soon to be taken DAs are evaluated relative to end-user selections during the onboarding interval or later. Without limitation, the near-live instructions 164 may display a smart sharing suggestion in response to new DA captures or soon to be taken DAs relate to: an event or activity related to selected participants of the shared DA library; an event or activity related to a DA that was previously shared automatically or manually by the end-user. In some example embodiments, the near-live instructions 164 may display a smart sharing suggestion that all DAs related to an event or activity, that were not shared or rejected previously, be shared. In some example embodiments, the smart sharing suggestions rely on filters 172 to remove blurry, accidental pocket captures, etc. Over time, further analysis (e.g., using proximity detection of shared DA library participants, location detection relative to a significant location, trip detection, DA analysis, sharable context metrics, etc.) may be performed and related machine learning results may be applied to improve the smart sharing suggestions available during each near-live interval.

The deferred instructions 166 are performed after an end-user device is left plugged in. During the deferred interval, the deferred instructions 166 may perform further analysis on new DAs captured or obtained during the day to extract additional contextual information. In some example embodiments, the personal DA library application analysis DAs and additional suggestions are displayed to an end-user using the full availability of contextual information. Without limitation, smart sharing suggestions during the deferred interval may include: import of DAs that contain interesting people; import of DAs from a relevant event or activity (e.g., a trip); a list of people whose faces may be shared; and modification of the list of participants for the shared DA library. In some example embodiments, an end-user may confirm or reject faces for people related to the smart sharing suggestions of the deferred interval. Again, filters 172 may be applied during the deferred interval to avoid suggesting duplicates, utility photos, and/or imports from known poor quality content sources (e.g., browser downloads). Over time, further analysis (e.g., using proximity detection of shared DA library participants, location detection relative to a significant location, trip detection, DA analysis, sharable context metrics, etc.) may be performed and related machine learning results may be applied to improve the smart sharing suggestions available during each deferred interval.

As needed, DAs are linked to the shared DA library, resulting in updates to the personal DA knowledge graph 112 and the shared DA knowledge graph 124. Depending on the circumstances (battery level, wireless channel condition, the number of DAs to be added to the shared DA library, etc.), the shared DA library is populated more quickly or less quickly with new DAs. Once the shared DA library is populated and related links are complete, the DAs in the shared DA library are available for query, organization, and featured DA options of the shared DA library.

In some example embodiments, the personal DA library of the end-user sharing DAs to the shared DA library does not see a difference in their personal DA library even through some DAs displayed in the end-user's personal DA library will be stored separately in cloud-based storage for the shared DA library rather than cloud-based storage for the personal DA library. To organize and feature DAs of the personal DA library and/or the shared DA library, updated knowledge graphs or linked knowledge graphs may be used.

As shown, the computer-readable memory 110 may store and/or retrieve DA metadata 114, the knowledge graphs 120, and/or optional data described by or associated with the DA metadata 114. The DA metadata 114, the knowledge graphs 120, and/or the optional data can be generated, processed, and/or captured by the other components in the system 100. For example, the DA metadata 114, the knowledge graphs 120, and/or the optional data may include data generated by, captured by, processed by, or associated with one or more peripherals 130, the DA capture device(s) 102, or the processing unit(s) 140, etc. The system 100 can also include a memory controller (not shown), which includes at least one electronic circuit that manages data flowing to and/or from the computer-readable memory 110. The memory controller can be a separate processing unit or integrated in processing unit(s) 140.

In some example embodiments, the DA capture device(s) 102 is an imaging device for capturing images, an audio device for capturing sounds, a multimedia device for capturing audio and video, any other known DA capture device. The DA capture device(s) 102 is illustrated with a dashed box to show that it is an optional component of the system 100. In one embodiment, the DA capture device (s) 102 can also include a signal processing pipeline that is implemented as hardware, software, or a combination thereof. The signal processing pipeline can perform one or more operations on data received from one or more components in the DA capture devices) 102. The signal processing pipeline can also provide processed data to the computer-readable memory 110, the peripheral(s) 130 (as discussed further below), and/or the processing unit(s) 140.

The peripheral(s) 130 can include at least one of the following: (i) one or more input devices that interact with or send data to one or more components in the system 100 (e.g., mouse, keyboards, etc.); (ii) one or more output devices that provide output from one or more components in the system 100 (e.g., monitors, printers, display devices, etc.); or (iii) one or more storage devices that store data in addition to the computer-readable memory 110. Peripheral(s) 130 is illustrated with a dashed box to show that it is an optional component of the system 100. The peripheral(s) 130 may also refer to a single component or device that can be used both as an input and output device (e.g., a touch screen, etc.). The system 100 may include at least one peripheral control circuit (not shown) for the peripheral(s) 130. The peripheral control circuit can be a controller (e.g., a chip, an expansion card, or a stand-alone device, etc.) that interfaces with and is used to direct operation(s) performed by the peripheral(s) 130. The peripheral(s) controller can be a separate processing unit or integrated in processing unit(s) 140. The peripheral(s) 130 can also be referred to as input/output (I/O) devices throughout this document.

As shown, the system 100 also include one or more sensors 134, which are illustrated with a dashed box to show that the sensors 130 are optional components of the system 100. For one embodiment, the sensor(s) 130 can detect a characteristic of one or more environs. Examples of a sensor include, but are not limited to: a light sensor, an imaging sensor, an accelerometer, a sound sensor, a barometric sensor, a proximity sensor, a vibration sensor, a gyroscopic sensor, a compass, a barometer, a heat sensor, a rotation sensor, a velocity sensor, and an inclinometer.

In the example of FIG. 1, the system 100 includes a communication mechanism 132. The communication mechanism 132 can be, e.g., a bus, a network, or a switch. When the communication mechanism 132 is a bus, the communication mechanism 132 transfers data between components in system 100, or between components in system 100 and other components associated with other systems (not shown). As a bus, the communication mechanism 132 includes all related hardware components (wire, optical fiber, etc.) and/or software, including communication protocols. For one embodiment, the communication mechanism 132 can include an internal bus and/or an external bus. Moreover, the communication mechanism 132 can include a control bus, an address bus, and/or a data bus for communications associated with the system 100. For one embodiment, the communication mechanism 132 can be a network or a switch. As a network, the communication mechanism 132 may be any network such as a local area network (LAN), a wide area network (WAN) such as the Internet, a fiber network, a storage network, or a combination thereof, wired or wireless. When the communication mechanism 132 is a network, the components in the system 100 do not have to be physically co-located. When the communication mechanism 132 is a switch (e.g., a "cross-bar" switch), separate components in system 100 may be linked directly over a network even though these components may not be physically located next to each other. For example, two or more of the processing unit(s) 140, the communication mechanism 132, the computer-readable memory 110, the peripheral(s) 130, the sensor(s) 134, and the DA capture device 102 are in distinct physical locations from each other and are communicatively coupled via the communication mechanism 132, which is a network or a switch that directly links these components over a network.

Figure 2:
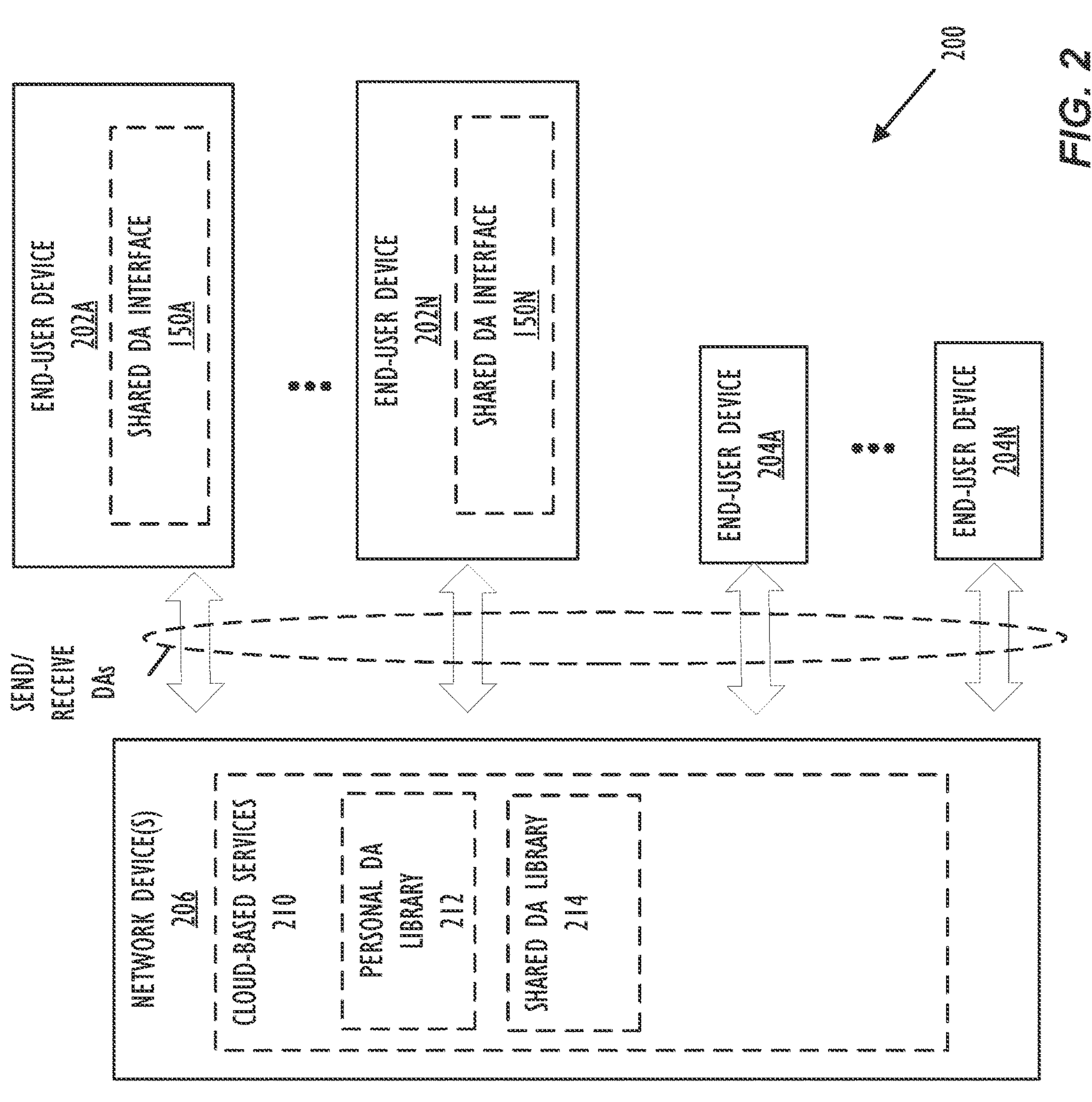
FIG. 2 illustrates, in block diagram form, a system with networked end-user devices in accordance with an embodiment.

FIG. 2 illustrates, in block diagram form, a system 200 with networked end-user devices in accordance with an embodiment. In the system 200, the end-user devices 202A-202N include respective shared DA interfaces 150A-150N (examples of the shared DA interface 150 in FIG. 1), and may include a DA management system (e.g., the DA management system 100 in FIG. 1). The system 200 may also include end-user devices 204A-204N without DA managers or with legacy DA managers that lack a shared DA interface as described herein. In the system 200, DAs may be sent and received between the end-user devices 202A-202N and 204A-204N via network device(s) 206 and respective messaging applications. The network device(s) 206 include wired and/or wireless communication interfaces. In some example embodiments, the network device(s) 206 provide cloud storage and/or computing options for the end-user devices 202A-202N and 204A-204N. Over time, the number of DAs stored by each of the end-user device 202A-202N and 204A-204N generally increases as more DAs are captured by each respective end-user device or are obtained from other end-user device(s) or the network device(s). Some of the DAs will be more meaningful to smart sharing options for populating a shared DA library, while others are less meaningful. In the end-user devices 204A-204N, participation in shared DA libraries may be unavailable or limited without installation of an additional application. In contrast, the end-user devices 202A-202N with respective shared DA interfaces 150A-150N perform smart sharing options as described herein.

Figure 3:
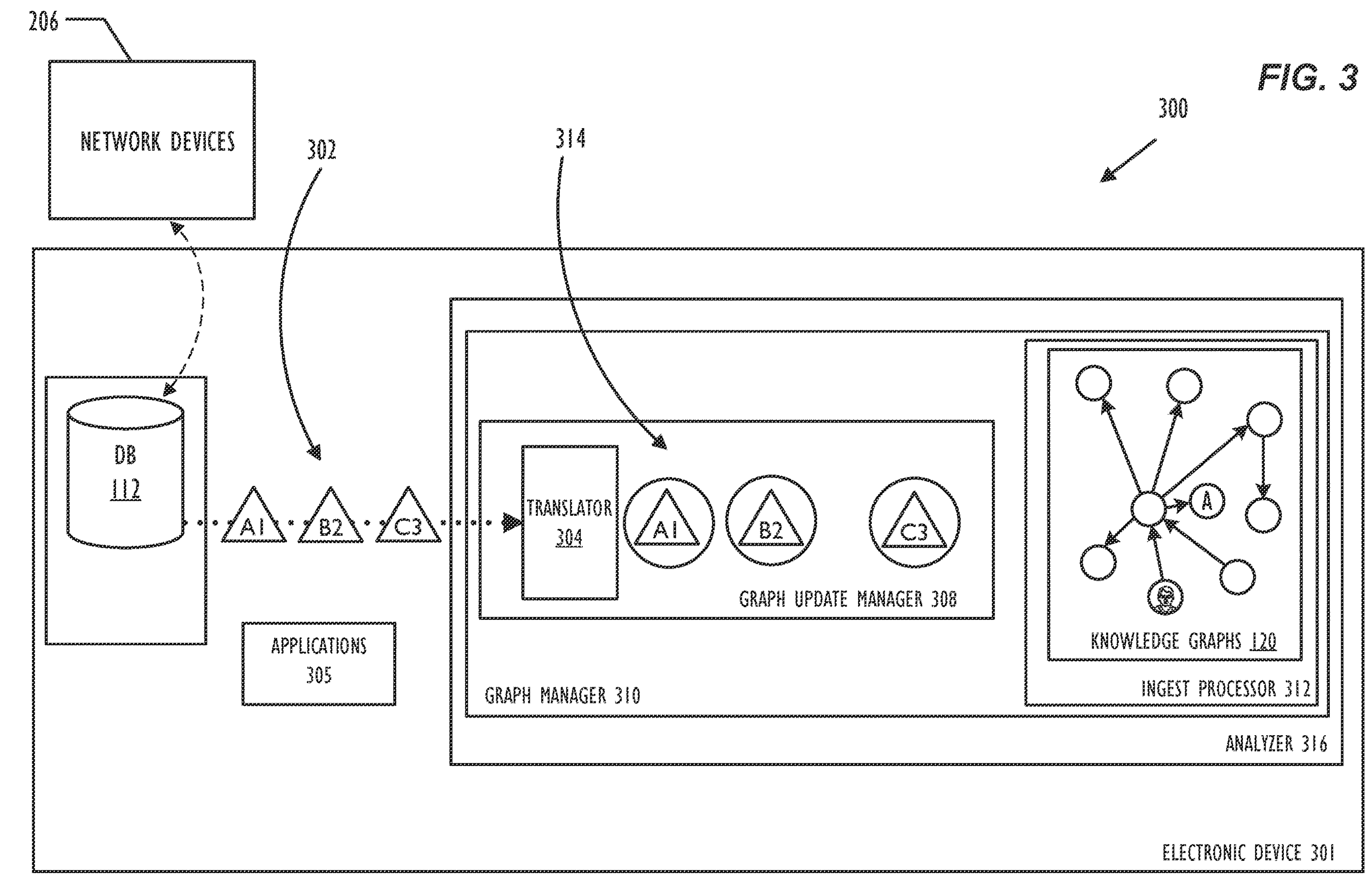
FIG. 3 illustrates, in block diagram form, a knowledge graph update architecture, in accordance with an embodiment.

FIG. 3 illustrates an architecture 300 for updating knowledge graphs 120 by a DA management system (e.g., the DA management system 100 in FIG. 1) based on changes in a relational database 112. In the example of FIG. 3, the architecture 300 includes an electronic device 301 (e.g., one of the end-user devices 202A-202N with respective DA managers 106A-106N) in communication with network devices) 206. In some example embodiments, with the architecture 300, the knowledge graphs 120 are updated periodically (e.g., a twenty-four hour cycle) with changes in the relational database being considered in series. Updating in this manner can involve making changes to knowledge graphs 120 that do not need to be made immediately, such as updates to an event node due to a change in the relational database 112. It is also possible to attempt to update knowledge graphs 120 every time a change is made to the relational database 112. However, in many cases it can be preferable to consider a batch or group of change notifications 302 from the relational database 112 collectively. Doing so can, as explained in greater detail below, enable a DA processing system to ignore changes (e.g., B2) which are, for example, redundant in light of a subsequent change (e.g., A1). This functionality is provided by the translator 304. The translator 304 is a translational layer of a DA management system. The manner in which the translator 304 chooses updates is encoded in code and executed by one or more processing units 140.

As noted previously, knowledge graphs 120 responds to updates, modifications, and changes that occur in the relational database 112. The relational database 112 is thus separate from the knowledge graphs 120. The relational database 112 supports functionality of various native applications 305 (such as a photos application) as well as second-party and third-party applications. All of the asset data is maintained in the relational database 112. Changes in the data stored by the relational database 112 can be brought about by interactions with the applications 305 and with the network devices) 206 (e.g., supporting data transfers between end-user devices, cloud storage/computing options, etc.). The knowledge graphs 120 can often respond in real time to changes in the relational database 112. This real-time responsiveness is enabled, in part, by culling changes in the relational database 112 which do not necessitate a modification, change, or update within the knowledge graphs 120. The translator 304 can also manage the situation in which change (e.g., C3) is currently being implemented and additional change notifications (e.g., A1 and B2) are received by the graph update manager 308. Such changes are buffered and be processed in batches. Buffering change notifications and separating the redundant and/or cumulative and/or irrelevant changes reduces the computational intensity to implement such changes in the knowledge graph 120 than would otherwise by the case.

The better management of relational database 112 provides a finer grain data stream, which makes it possible to be more circumspect or targeted as to what changes will be translated into updates by the translator 304. The translator 304 component of the graph manager 310 can identify certain changes that come from the relational database 112 that are not relevant to the knowledge graphs 120. For example, in one embodiment the knowledge graphs 120 does not track ‘albums’ data objects used by a photos application (e.g., one of the applications 305) and stored by the relational database 112.

The translator 304 can also make distinctions at a property level (fields within an object). For example, the translator translates changes to certain media assets, but not all changes to those media assets. For example, there can be states that relational database 112 needs in order to keep track of assets, but that have no bearing on the nodes and edges of the knowledge graph 120. The translator 304 can note the properties of an object that have changed and determine whether those properties could affect changes in the nodes or edges in the knowledge graphs 120, and thereby only translate those property changes which would do so. This is an example of the translator 304 making a determination as to whether change(s) in a relational database which are detected warrant making corresponding modifications to information in one or more graph networks. Another example of when a change would not warrant an update is when a subsequent change (both under consideration by the translator component) negates it. For example, if it is shown in the relational database 112 that a person has friended, and then unfriended, another person, it would serve no purpose to note the friendship status only to immediately remove/overwrite it When not unwarranted (i.e., warranted), the translator 304 translates the detected changes 302 into graph update specifications and/or modification instructions 314. The ingest processor 312 receives and applies the modification instructions 314 to the knowledge graphs 120. The graph manager 310 and its subcomponents are hosted by the analyzer (daemon) 316 within an electronic device (see e.g., the end-user device 100 of FIG. 1).

In one example embodiment, the nodes and edges of the knowledge graphs 120 are considered in two main levels: there are the node primitives: moment, person, date and location; and there are more abstract higher-level nodes which are derived from the primitives. The moment, person, date and location can be driven, updated and managed directly based on changes coming directly from the relational database objects. Social groups are collections of person nodes within the knowledge graph 120. The knowledge graphs 120 infer the existence of the social group, though the social group has no counterpart in the relational database 112. The social group can be very large and have many person nodes, each of which may have multiple relationships (edges) with other nodes. Thus, changing a single property of a node (based on a change in a property of an object) in the relational database 112 can necessitate a large number of modifications to the knowledge graphs 120. In an embodiment, the translator 304 can determine, based on computational expense, which changes to translate more immediately and which changes to delay. In another embodiment, the translator 304 provides input to a set of post processing steps (not shown) that are responsible for taking the graph update specification(s) 314 generated by the translator 304 and using the specification(s) 314 along with updated knowledge graphs 120 (i.e., the knowledge graphs 120 after updates by the translator 304 are applied) to produce additional updates to the high-level nodes in the knowledge graphs 120.

In one example, the translator 304 may receive a notice indicating that a new object, such as a moment object, has been created. The translator 304 might then receive notice that a location property of the moment object has changed, and thereafter that the time property of the moment object. In order to save time and computational expense, the new moment object can be added to the knowledge graphs 120 with all three properties at once. In some cases, even with such consolidation, some updates to the knowledge graphs 120 can be computationally expensive. It can take time to evaluate what aspects of the nodes need to be updated, especially in terms of relationships. A person object could have its name property changed, (perhaps a user of the electronic device that includes a DA management system might realize he had misspelled his wife's name and decide to correct it). A person node corresponding to that object may have faces distributed across multiple moment nodes. It can be expensive to all of such moment nodes. In that case, a DA management system can do a fast update to record the fact in a person node that the name has been changed, but without immediately working out all of the details of relationships in the knowledge graphs 120 that might be affected.

In some example embodiments, the knowledge graphs 120 maintained and updated using the architecture 300 may include a personal DA knowledge graph 122 and a shared DA knowledge graph 124. Initially, many DAs will not be linked to the shared DA library. Through the smart sharing options described herein, DAs related to the personal DA library or a syndication library become linked to the shared DA library. As needed, the architecture 300 updates the personal DA knowledge graph 122 and the shared DA knowledge graph 124 to track new DAs and new sharing of DAs.

Figure 4:
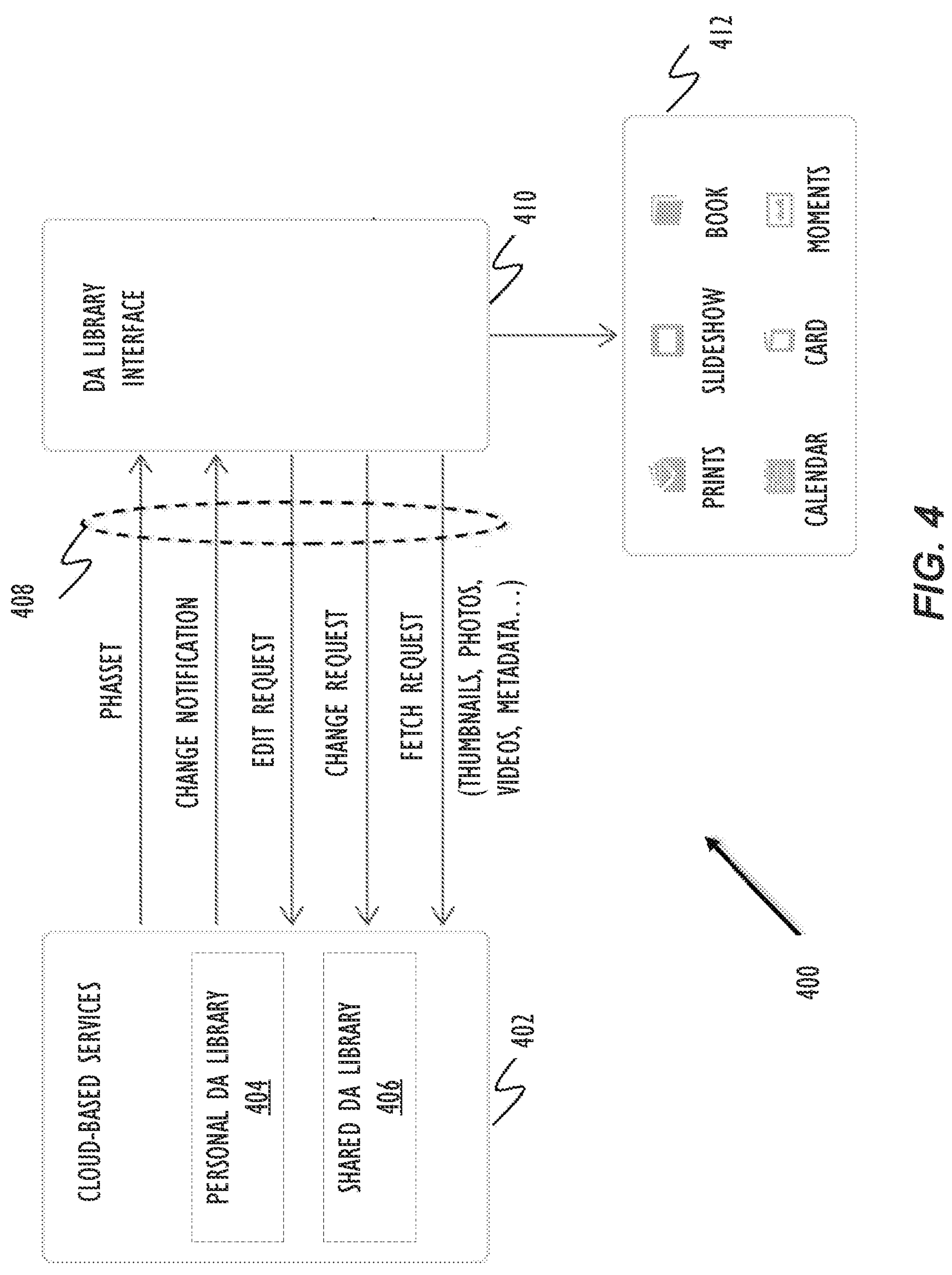
FIG. 4 illustrates, in block diagram form, DA library operations, in accordance with an embodiment.

FIG. 4 illustrates, in block diagram form, a DA library scenario 400, in accordance with an embodiment. In the example of FIG. 4, the DA library scenario 400 includes cloud-based services 402 and related devices configured to maintain a personal DA library 404 and a shared DA library 406. The personal DA library 404 and a shared DA library 406 maintained by the cloud-based services and/or DAs in a local DA library are accessible via a DA library interface 410. In some example embodiments, the DA library interface 410 (e.g., the PhotoKit interface from Apple Inc.) provides classes that support building photo-editing extensions for the personal DA library 404 and/or shared DA library 406. For different operating systems (e.g., iOS®, macOS®, and tvOS® operating systems, of which iOS is a registered trademark of Cisco Technology Inc., and macOS and tvOS are registered trademarks of Apple Inc.), the DA library interface 410 also provides direct access to DAs managed by a Photos application. Example operations 408 that are handled by the DA library interface 410 include fetching and caching assets of the personal DA library 404 and/or shared DA library 406 for display and playback, editing image and video content, or managing collections of assets such as albums or shared albums. Example projects 412 supported by the DA library interface 410 include prints, slideshows, books, calendars, moments, and wall décor. In some example embodiments, the DA library interface 410 includes or is in communication with a DA manager (e.g., a shared DA interface 150 or related processor(s)) configured to perform smart sharing options as described herein. With the smart sharing options, the shared DA library 406 becomes populated with DAs in a manner that is user-friendly and efficient while accounting for contextual variations and end-user privacy goals. Once the shared DA library 406 is populated, the DAs of the shared DA library 406 are available to all participants. As an example, each participant of the shared DA library 406 may utilize query, organization, and featured DA options related to operations 408, projects 412 and/or other access options.

Figure 5:
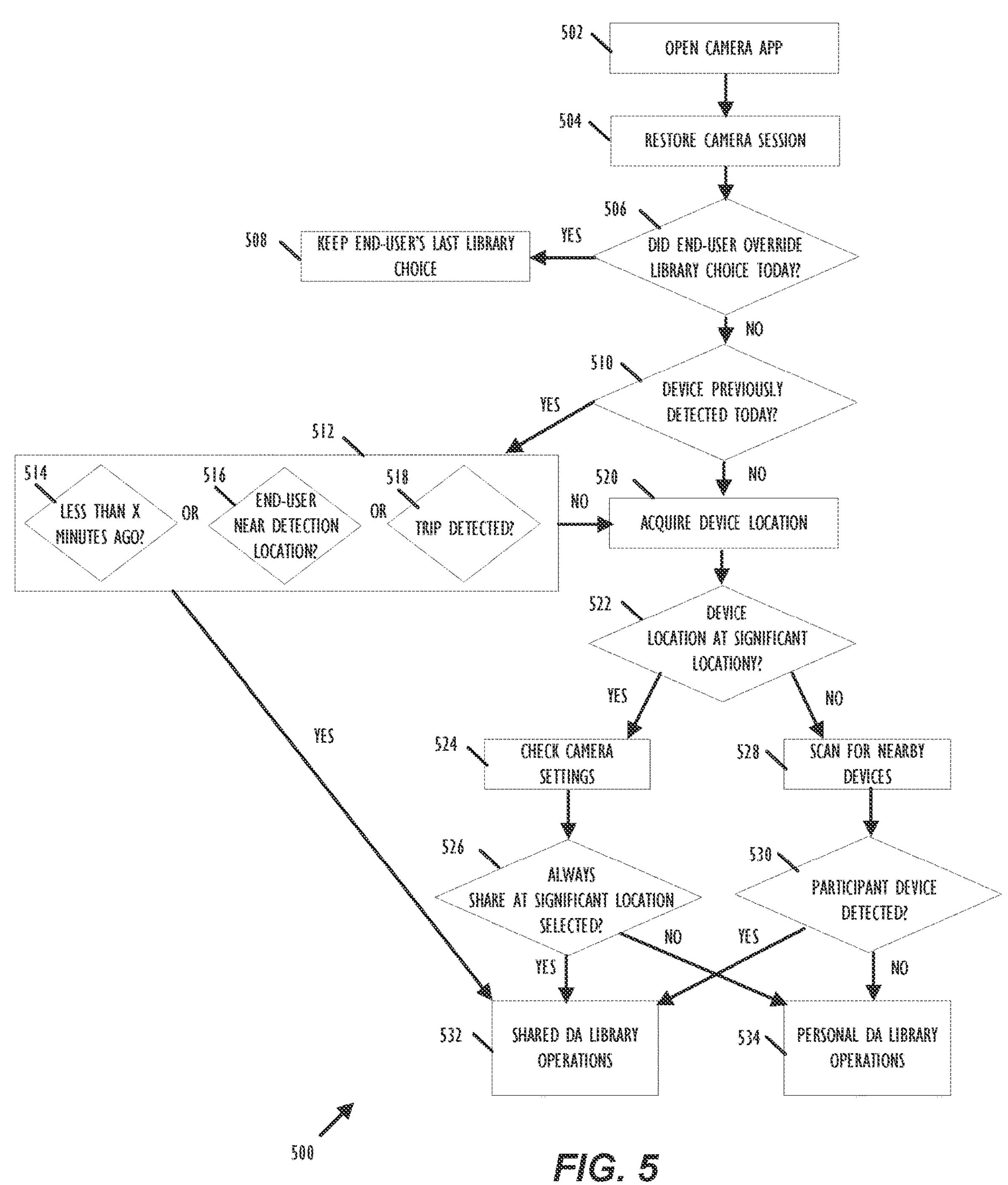
FIG. 5 illustrates, in flowchart form, a smart sharing method that selects between a personal DA library and a shared DA library in accordance with an embodiment.

FIG. 5 illustrates, in flowchart form, a smart sharing method 500 that selects between a personal DA library (e.g., the personal DA library 404 in FIG. 4) and a shared DA library (e.g., the shared DA library 406 in FIG. 4) in accordance with an embodiment. As shown, the method 500 include opening a camera application (e.g., the camera interface 126 in FIG. 1) at block 502. At block 504, a camera session is restored. If an end-user has overridden the library choice today (determination block 506), the end-user's last library choice (e.g., shared mode on or off, where shared mode off means the personal DA library is chosen) is kept at block 508. Otherwise, if an end-user has not overridden the library choice today (determination block 506), a determination is made regarding whether the device was previously detected today (determination block 510). If the device was previously detected today (determination block 510), context options are considered at block 512. The context options of block 512 include: determining if the previous device detected occurred less than X minutes (e.g., 5 minutes) ago (determination block 514); determining if the end-user is near the previous detection location (determination block 516); or detecting a trip (determination block 518). If none of the context options of block 512 are true, the method 500 proceeds to block 520 to acquire the device location. A determination is then made regarding whether the device location is at a significant location (e.g., home) (determination block 522). If the device location is at the significant location (determination block 522), camera settings are checked at block 524. If an always share at significant location option is selected (determination block 526), the method 500 proceeds to shared DA library operations at block 532. Also, if any of the context options of block 512 are true, the method 500 proceeds to block 532 to perform shared DA library operations. If an always share at significant location option is not selected (determination block 526), the method 500 proceeds to personal DA library operations at block 534.

If the device location is not at the significant location (determination block 522), a scan for nearby devices is performed at block 528. If a participant device is detected (determination block 530), the method 500 proceeds to shared DA library operations at block 532. If a participant device is not detected (determination block 530), the method 500 proceeds to personal DA library operations at block 534. In some example embodiments, the method 500 may include additional or alternative operational related to the smart sharing options, override options, and/or smart sharing suggestion options described herein.

Figure 6:
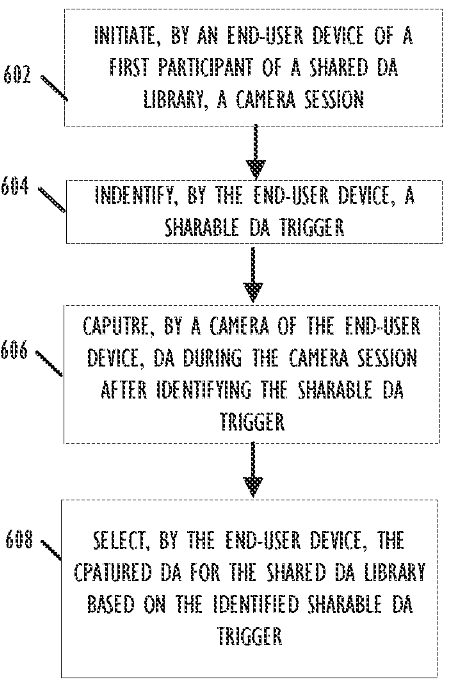
FIG. 6 illustrates, in flowchart form, a smart sharing method for populating a shared DA library in accordance with an embodiment.

FIG. 6 illustrates, in flowchart form, a smart sharing method 600 for populating a shared DA library (e.g., the shared DA library 406 in FIG. 4) in accordance with an embodiment. As shown, the method 600 includes initiating, by an end-user device of a first participant of a shared DA library, a camera session at block 602. At block 604, a sharable DA trigger is identified by the end-user device. Without limitation, the sharable DA trigger may include share mode toggling, automatic sharing setting selection, proximity detection, location detection, trip detection, captured DA analysis, camera preview analysis, sharing context metrics, and/or other detectable triggers. At block 606, a DA is captured after the sharable DA rigger is identified. At block 608, the captured DA is selected for the shared DA library based on the identified sharable DA trigger.

In some example embodiments, identifying the sharable DA trigger at block 604 includes detecting a second participant of the shared DA library as being within a target proximity of the end-user device. In some example embodiments, detecting the second participant of the shared DA library as being within the target proximity of the end-user device includes receiving a signal from the second participant's end-user device. In some example embodiments, identifying the sharable DA trigger at block 604 includes the first participant selecting a sharing option (e.g., the share mode) displayed during the camera session. In some example embodiments, the sharable DA trigger includes the first participant selecting a sharing option displayed during a previous camera session. In some example embodiments, identifying the sharable DA trigger at block 604 is based on the first participant selecting sharing options before the camera session, the sharing options including a sharing start-time and a sharing end-time. In some example embodiments, identifying the sharable DA trigger at block 604 is based on a location of the end-user device relative to a significant location.

In some example embodiments, selecting the captured DA for the shared DA library at block 608 is based on the first participant responding to a suggested sharing option displayed on the end-user device. The suggested sharing option may be displayed on the end-user device as part of a camera preview of the camera session before capturing the DA and based on DA analysis of camera preview content. As another option, the suggested sharing option may be displayed on the end-user device after the camera session has ended and responsive to a deferred DA analysis performed while the end-user device is plugged in, the deferred DA analysis producing a list of suggested DA to transfer from a personal DA library of the first participant to the shared DA library.

In some example embodiments, the method 600 includes: determining a sharing context metric for the end-user device; and maintaining a share mode during multiple camera sessions of the end-user device as long as the sharing context metric stays above a sharing context metric threshold. In some example embodiments, the method 600 includes: receiving an onboarding request from the first participant related to the shared DA library; in response to receiving the onboarding request, performing a DA analysis of previously captured DA in a personal DA library of the first participant, and transferring a DA from the personal DA library to the shared DA library based on the DA analysis.

In some example embodiments, the method 600 includes: displaying a list of suggested DA for the shared DA library based on the DA analysis; receiving inputs from the first participant regarding the displayed list of suggested DA for the shared DA library; and transferring at least some of the suggested DA from the personal DA library of the first participant to the shared DA library based on the received inputs. In some example embodiments, the DA analysis produces automatic sharing suggestions or automatic sharing rules for future DA. In some example embodiments, the method 600 includes: establishing multiple shared DA libraries for the first participant; and selecting between the multiple shared DA libraries based on the identified sharable DA trigger.

Figure 7:
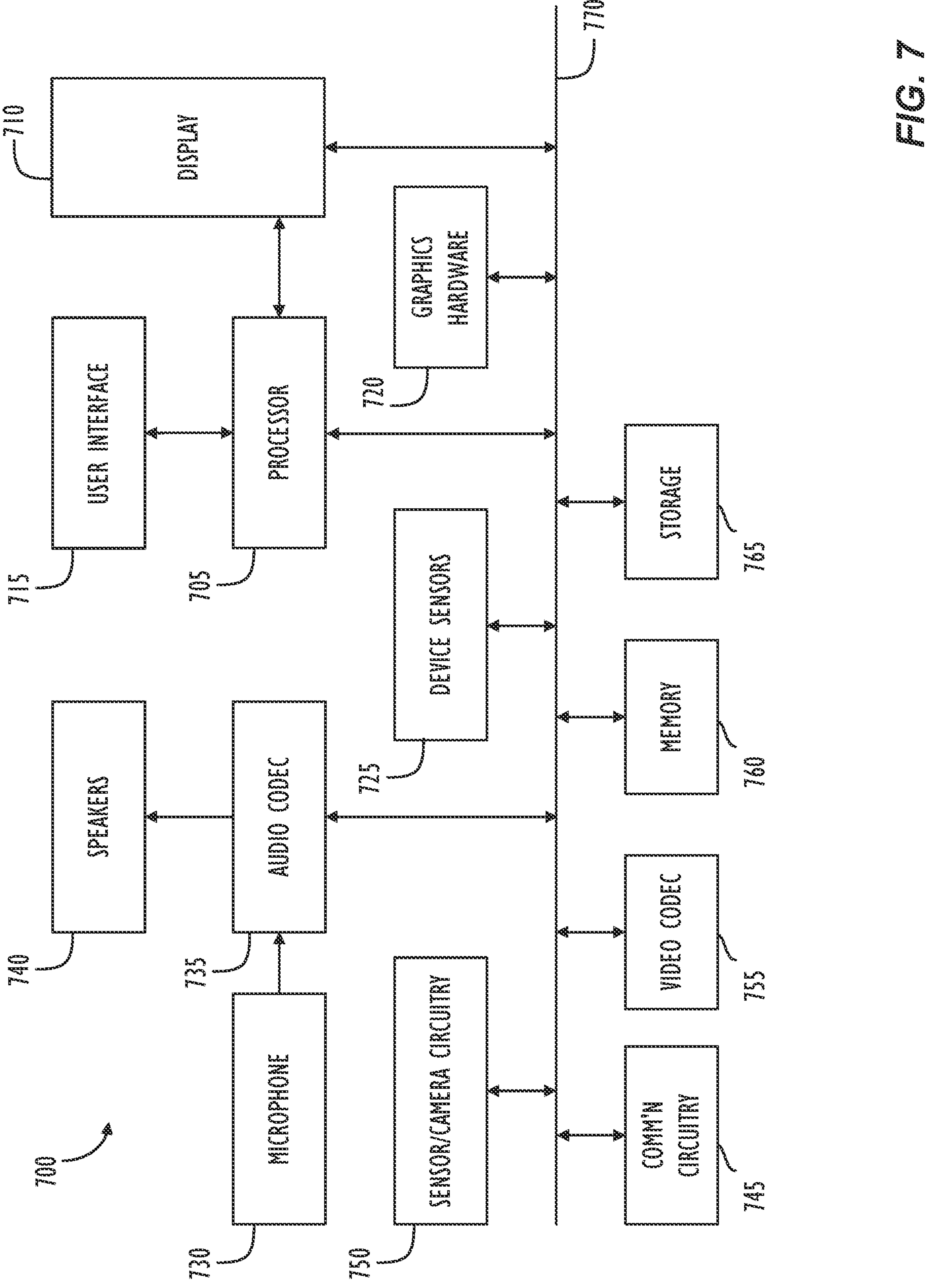
FIG. 7 illustrates a simplified functional block diagram of illustrative programmable electronic device for DA management in accordance with an embodiment.

Referring now to FIG. 7, a simplified functional block diagram of an illustrative programmable electronic device 700 (an example of the DA management system 100 in FIG. 1, or one of the end-user devices 202A-202N in FIG. 2) for performing DA management is shown, according to one embodiment. The electronic device 700 could be, for example, a mobile telephone, personal media device, portable camera, or a tablet, notebook or desktop computer system, as well as a wearable computing device such as a smart watch. As shown, electronic device 700 may include a processor 705, a display 710, a user interface 715, a graphics hardware 720, device sensors 725 (e.g., proximity sensor/ambient light sensor, accelerometer and/or gyroscope), a microphone 730, audio codec(s) 735, speaker(s) 740, communications circuitry 745, image capture circuit or unit 750, which may, e.g., comprise multiple camera units/optical sensors having different characteristics (as well as camera units that are housed outside of, but in communication with the electronic device 700), video codec(s) 755, computer-readable memory 760, storage 765, and communications bus 770.

The processor 705 may execute instructions necessary to carry out or control the operation of many functions performed by the electronic device 700 (e.g., such as the generation and/or processing of DAs in accordance with the various embodiments described herein). The processor 705 may, for instance, drive the display 710 and receive user input from the user interface 715. The user interface 715 can take a variety of forms, such as a button, keypad, dial, a click wheel, keyboard, display screen and/or a touch screen. The user interface 715 could, for example, be the conduit through which a user may view a captured video stream and/or indicate particular images(s) that the user would like to capture or share (e.g., by clicking on a physical or virtual button at the time that the desired image is being displayed on the device's display screen).

In one embodiment, the display 710 may display a video stream as it is captured while the processor 705 and/or the graphics hardware 720 and/or image capture circuitry contemporaneously store the video stream (or individual image frames from the video stream) in the computer-readable memory 760 and/or the storage 765. The processor 705 may be a system-on-chip such as those found in mobile devices and include one or more dedicated graphics processing units (GPUs). The processor 705 may be based on reduced instruction-set computer (RISC) or complex instruction-set computer (CISC) architectures or any other suitable architecture and may include one or more processing cores. The graphics hardware 720 may be special purpose computational hardware for processing graphics and/or assisting processor 705 perform computational tasks. In one embodiment, graphics hardware 720 may include one or more programmable graphics processing units (GPUs).

The image capture circuitry 750 may comprise one or more camera units configured to capture images, e.g., images which may be managed by a DA management system. Output from the image capture circuitry 750 may be processed, at least in part, by the video codec(s) 755 the processor 705, the graphics hardware 720, and/or a dedicated image processing unit incorporated within circuitry 750. Images so captured may be stored in the computer-readable memory 760 and/or the storage 765. The computer-readable memory 760 may include one or more different types of media used by the processor 705, the graphics hardware 720, and the image capture circuitry 750 to perform device functions. For example, the computer-readable memory 760 may include memory cache, read-only memory (ROM), and/or random-access memory (RAM). The storage 665 may store media (e.g., audio, image and video files), computer program instructions or software, preference information, device profile information, and any other suitable data. The storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). The computer-readable memory 660 and the storage 765 may be used to retain computer program instructions or code organized into one or more modules and written in any desired computer programming language. When executed by, for example, the processor 705, such computer program code may implement one or more of the methods described herein.

For clarity of explanation, the embodiment of FIG. 7 is presented as including individual functional blocks including functional blocks labeled as the processor 705 or the graphics hardware 720. The functions these blocks represent may be provided through the use of either shared or dedicated hardware, including, but not limited to, hardware capable of executing software and hardware, such as the processor 705 or the graphics hardware 720, that is purpose-built to operate as an equivalent to software executing on a general-purpose processor. For example, the functions of one or more processors presented in FIG. 7 may be provided by a single shared processor or multiple processors. (Use of the term "processor" should not be construed to refer exclusively to hardware capable of executing software.) Illustrative embodiments may include microprocessor and/or digital signal processor (DSP) hardware, ROM for storing software performing the operations discussed below, and RAM for storing results, both of which may be subsumed within the computer-readable memory 760. Very large-scale integration (VLSI) hardware embodiments, as well as custom VLSI circuitry in combination with a general-purpose DSP circuit, may also be provided.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In some example embodiments, a system (e.g., the DA management system 100 of FIG. 1, any of the end-user devices 202A-202N of FIG. 2, or the electronic device 700 of FIG. 7) includes: one or more processors (e.g., the processing unit(s) 140 in FIG. 1, or the processor 705 in FIG. 7); one or more sensors (e.g., the DA capture device(s) 102 in FIG. 1, or the sensor/camera circuitry 750 in FIG. 7) configured to capture DAs; a memory (e.g., the computer-readable memory 110 in FIG. 1, memory of the processing unit(s) 140 in FIG. 1, and/or memory 760 and storage 765 in FIG. 7) for storing program instructions (e.g., the DA manager 142 or shared DA interface 150 in FIG. 1) for the one or more processors. The instructions, when executed, cause the one or more processors to: initiate a camera session; identify a sharable DA trigger; obtain DA captured the one or more sensors during the camera session after identifying the sharable DA trigger; and select the captured DA for a shared DA library based on the identified sharable DA trigger.

In some example embodiments, the instructions, when executed, further cause the one or more processors to identify the sharable DA trigger based on detection of a second participant of the shared DA library as being within a target proximity of an end-user device. In some example embodiments, the instructions, when executed, further cause the one or more processors to: receive a signal from the second participant's end-user device; and detect the second participant of the shared DA library as being within the target proximity of the end-user device based on the received signal. In some example embodiments, the instructions, when executed, further cause the one or more processors to identify the sharable DA trigger based on the first participant selecting a sharing option displayed during the camera session.

In some example embodiments, the instructions, when executed, further cause the one or more processors to identify the sharable DA trigger based on the first participant selecting a sharing option displayed during a previous camera session. In some example embodiments, the instructions, when executed, further cause the one or more processors to identify the sharable DA trigger based on the first participant selecting sharing options before the camera session, the sharing options including a sharing start-time and a sharing end-time. In some example embodiments, the instructions, when executed, further cause the one or more processors to identify the sharable DA trigger based on a location of an end-user device relative to a significant location.

In some example embodiments, the instructions, when executed, further cause the one or more processors to select the captured DA for the shared DA library based on the first participant responding to a suggested sharing option displayed on an end-user device. In some example embodiments, the instructions, when executed, further cause the one or more processors to display the suggested sharing option on the end-user device as part of a camera preview of the camera session before capturing the DA and based on DA analysis of camera preview content. In some example embodiments, the instructions, when executed, further cause the one or more processors to display the suggested sharing option on the end-user device after the camera session has ended and responsive to a deferred DA analysis performed while the end-user device is plugged in, the deferred DA analysis producing a list of suggested DA to transfer from a personal DA library of the first participant to the shared DA library. In some example embodiments, the instructions, when executed, further cause the one or more processors to: determine a sharing context metric for an end-user device; and maintain a share mode during multiple camera sessions of the end-user device as long as the sharing context metric stays above a sharing context metric threshold.

In some example embodiments, the instructions, when executed, further cause the one or more processors to: receive an onboarding request from the first participant related to the shared DA library; in response to receiving the onboarding request, perform a DA analysis of previously captured digital assets in a personal library of the first participant, and transfer digital content from the personal DA library to the DA library based on the digital content analysis. In some example embodiments, the instructions, when executed, further cause the one or more processors to: display a list of suggested digital content for the shared digital content library based on the digital content analysis; receive inputs from the first participant regarding the displayed list of suggested digital content for the shared digital content library; and transfer at least some of the suggested digital content from the personal digital content library of the first participant to the shared digital content library based on the received inputs.

In some example embodiments, the instructions, when executed, further cause the one or more processors to produce automatic sharing suggestions or automatic sharing rules for future digital content based on the digital content analysis. In some example embodiments, the instructions, when executed, further cause the one or more processors to: establish multiple shared digital content libraries for the first participant; and select between the multiple shared digital content libraries based on the identified sharable digital content trigger.

Although operations or methods have been described above in terms of some sequential operations, it should be appreciated that some of the operations described may be performed in a different order. Moreover, some operations may be performed in parallel, rather than sequentially. Embodiments described herein are not described with reference to any particular programming language. It will be appreciated that a variety of programming languages may be used to implement the various embodiments of the disclosed subject matter. In utilizing the various aspects of the embodiments described herein, it would become apparent to one skilled in the art that combinations, modifications, or variations of the above embodiments are possible for managing components of a processing system to increase the power and performance of at least one of those components.

As described above, one aspect of the present technology is the gathering and use of data available from various sources to improve the ability of users to manage and search for the information that is related to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to enable users to more quickly locate information for which they have an interest, and by extension the present disclosure enables users to have more streamlined and meaningful control of the content and information (personal and otherwise) that they share with others. Further, other uses for personal information data that benefit the user are also contemplated by the present disclosure. For instance, health and fitness data may be used to provide insights into a user's general wellness, or state of well-being during various moments or events in their lives.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by end-users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries or regions may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of DA management services, the present technology can be configured to allow users to select to "opt in" or "opt out" of participation in the collection of personal information data during registration for services or anytime thereafter. In another example, users can select not to provide their content and other personal information for inclusion in graph databases of others. In yet another example, users can select to limit the length of time their personal information data is maintained by a third party and/or entirely prohibit the development of a knowledge graph or other metadata profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be suggested for sharing to users by inferring preferences based on non-personal information data or a bare minimum amount of personal information within a user's relational database, such as the quality level of the content (e.g., focus, exposure levels, etc.) or the fact that certain content is being requested by a device associated with a contact of the user, other non-personal information available to the DA management system, or publicly available information.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., many of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

We claim:

1. A method of selecting digital assets (DAs) for a shared DA library, the method comprising:

transmitting, by an end-user device of a first participant, an onboarding request related to the shared DA library, wherein the shared DA library is stored in cloud-based storage;

in response to transmitting the onboarding request, performing a DA analysis of previously captured DAs in a personal DA library of the first participant, wherein the shared DA library is stored separately from the personal DA library of the first participant;

transferring a DA from the personal DA library to the shared DA library based on the DA analysis;

displaying, by the end-user device, a list of suggested DAs for the shared DA library based on the DA analysis, wherein the list of suggested DAs are further determined, by the end-user device, based on one or more smart sharing options specified by the first participant, and wherein each of the one or more smart sharing options comprises one or more of: a privacy consideration for DAs; a sharing preference for DAs; a sharable context metric computed for DAs; a DA sharing policy; or a DA sharing trigger instruction;

receiving inputs from the first participant regarding the displayed list of suggested DAs for the shared DA library;

transferring at least some of the suggested DAs from the personal DA library of the first participant to the shared DA library based on the received inputs;

initiating, by the end-user device of the first participant of the shared DA library, a camera session;

identifying, by the end-user device, a sharable DA trigger;

capturing, by a camera of the end-user device, a DA during the camera session after identifying the sharable DA trigger; and selecting, by the end-user device, the captured DA for the shared DA library based on the identified sharable DA trigger.

2. The method of claim 1, wherein identifying the sharable DA trigger includes detecting a second participant of the shared DA library as being within a target proximity of the end-user device.

3. The method of claim 1, wherein identifying the sharable DA trigger includes the first participant selecting a sharing option displayed during the camera session.

4. The method of claim 1, wherein the sharable DA trigger includes the first participant selecting a sharing option displayed during a previous camera session.

5. The method of claim 1, wherein identifying the sharable DA trigger is based on the first participant selecting sharing options before the camera session, the sharing options including a sharing start-time and a sharing end-time.

6. The method of claim 1, wherein identifying the sharable DA trigger is based on a location of the end-user device relative to a significant location.

7. The method of claim 1, further comprising:

determining a sharing context metric for the end-user device; and maintaining a share mode during multiple camera sessions of the end-user device as long as the sharing context metric stays above a sharing context metric threshold.

8. The method of claim 1, further comprising:

establishing multiple shared DA libraries for the first participant; and selecting between the multiple shared DA libraries based on the identified sharable DA trigger.

9. A system comprising:

a display device;

one or more processors;

one or more sensors configured to capture digital assets (DAS);

a memory for storing program instructions for the one or more processors, where the instructions, when executed, cause the one or more processors to:

transmit an onboarding request related to a shared DA library of a first participant, wherein the shared DA library is stored in cloud-based storage;

in response to transmitting the onboarding request, perform a DA analysis of previously captured DAs in a personal DA library of the first participant, wherein the shared DA library is stored separately from the personal DA library of the first participant;

transfer a DA from the personal DA library to the shared DA library based on the DA analysis;

display, by the system, a list of suggested DAs for the shared DA library based on the DA analysis, wherein the list of suggested DAs are further determined, by the system, based on one or more smart sharing options specified by the first participant, and wherein each of the one or more smart sharing options comprises one or more of: a privacy consideration for DAs; a sharing preference for DAS; a sharable context metric computed for DAs; a DA sharing policy; or a DA sharing trigger instruction;

receive inputs from the first participant regarding the displayed list of suggested DAs for the shared DA library;

transfer at least some of the suggested DAs from the personal DA library of the first participant to the shared DA library based on the received inputs;

initiate a camera session involving at least one of the one or more sensors;

identify a sharable DA trigger;

obtain a DA captured by at least one of the one or more sensors during the camera session after identifying the sharable DA trigger; and select the captured DA for the shared DA library based on the identified sharable DA trigger.

10. The system of claim 9, wherein the instructions, when executed, further cause the one or more processors to identify the sharable DA trigger based on detection of a second participant of the shared DA library as being within a target proximity of the system.

11. The system of claim 9, wherein the instructions, when executed, further cause the one or more processors to select the captured DA for the shared DA library based on a first participant responding to a suggested sharing option displayed on the display device.

12. The system of claim 11, wherein the instructions, when executed, further cause the one or more processors to display the suggested sharing option on the display device as part of a camera preview of the camera session before capturing the DA and based on DA analysis of camera preview content.

13. The system of claim 11, wherein the instructions, when executed, further cause the one or more processors to display the suggested sharing option on the display device after the camera session has ended and responsive to a deferred DA analysis performed at least a predetermined amount of time after a DA is captured or after the system is placed in a predetermined state or condition, the deferred DA analysis producing the list of suggested DAs to transfer from a personal DA library of the first participant to the shared DA library.

14. The system of claim 9, wherein the instructions, when executed, further cause the one or more processors to:

determine a sharing context metric for the system; and maintain a share mode during multiple camera sessions of the system, as long as the sharing context metric stays above a sharing context metric threshold.

15. The system of claim 9, wherein the instructions, when executed, further cause the one or more processors to produce automatic sharing suggestions or automatic sharing rules for future DAs based on the DA analysis.

16. The system of claim 9, wherein the instructions, when executed, further cause the one or more processors to:

establish multiple shared DA libraries for the first participant; and select between the multiple shared DA libraries based on the identified sharable DA trigger.

* * * * *